US011368283B2

(12) United States Patent
Satpathy et al.

(10) Patent No.: US 11,368,283 B2
(45) Date of Patent: Jun. 21, 2022

(54) ENCRYPTION AND DECRYPTION ENGINES WITH SELECTIVE KEY EXPANSION SKIPPING

(71) Applicant: Facebook Technologies, LLC, Menlo Park, CA (US)

(72) Inventors: Sudhir Satpathy, Redmond, WA (US); Wojciech Stefan Powiertowski, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 363 days.

(21) Appl. No.: 16/722,417

(22) Filed: Dec. 20, 2019

(65) Prior Publication Data

US 2021/0152330 A1 May 20, 2021

Related U.S. Application Data

(60) Provisional application No. 62/935,948, filed on Nov. 15, 2019.

(51) Int. Cl.
*H04L 9/06* (2006.01)
*G06F 21/60* (2013.01)
(Continued)

(52) U.S. Cl.
CPC .......... *H04L 9/0631* (2013.01); *G06F 21/602* (2013.01); *H04L 9/088* (2013.01);
(Continued)

(58) Field of Classification Search
CPC . H04L 9/0631; H04L 9/088; H04L 2209/122; H04L 2209/24; H04L 9/0897;
(Continued)

(56) References Cited

U.S. PATENT DOCUMENTS

2007/0110053 A1 * 5/2007 Soni ................. H04L 47/32
370/389
2019/0132297 A1 * 5/2019 Ammanur ............. H04L 69/22

FOREIGN PATENT DOCUMENTS

CN     111030980 A   *  4/2020
CN     210469376 U   *  5/2020
(Continued)

OTHER PUBLICATIONS

"Announcing the Advanced Encryption Standard (AES)," Federal Information Processing Standards Publication 197, Nov. 26, 2001, 51 pp.

(Continued)

*Primary Examiner* — Mohammed Waliullah
(74) *Attorney, Agent, or Firm* — Shumaker & Sieffert, P.A.

(57) ABSTRACT

A system on a chip (SoC) includes a security processor configured to determine that a first channel ID describing a {source, destination} tuple for a crypto packet matches a second channel ID describing a corresponding {source, destination} tuple for a preceding crypto packet received immediately prior to the crypto packet. The SoC also includes a decryption engine configured to, responsive to the determination that the first channel ID matches the second channel ID: obtain a set of round keys applied to perform an add round key computational stage of a previous decryption datapath used to decrypt a preceding cipher text block obtained from the preceding crypto packet, and to reuse the set of round keys to perform a corresponding add round key computational stage of a current decryption datapath used to decrypt a cipher text block obtained from the crypto packet.

20 Claims, 10 Drawing Sheets

(51) Int. Cl.
*H04L 9/08* (2006.01)
*G06F 1/32* (2019.01)

(52) U.S. Cl.
CPC .......... *G06F 1/32* (2013.01); *H04L 2209/122* (2013.01); *H04L 2209/24* (2013.01)

(58) Field of Classification Search
CPC .......... G06F 21/602; G06F 1/32; G06F 1/163; G06F 1/1698; G06F 3/011; G06F 2221/2107; G06F 21/72
See application file for complete search history.

(56) References Cited

FOREIGN PATENT DOCUMENTS

| | | | | |
|---|---|---|---|---|
| EP | 3866427 A1 | * | 8/2021 | ......... H04L 63/0485 |
| JP | 2001127757 A | * | 5/2001 | ............. H04H 60/15 |

OTHER PUBLICATIONS

"SMS4 Encryption Algorithm for Wireless Networks," Version 1.03, May 15, 2008, 6 pp. (translated by DIFFIE et al.).
Aoki et al., "Specification of Camellia—a 128-bit Block Cipher," NTT and Mitsubishi Electric Corporation, Sep. 26, 2001, 35 pp.
U.S. Appl. No. 16/506,618, filed Jul. 9, 2019, by Atlas et al.

\* cited by examiner

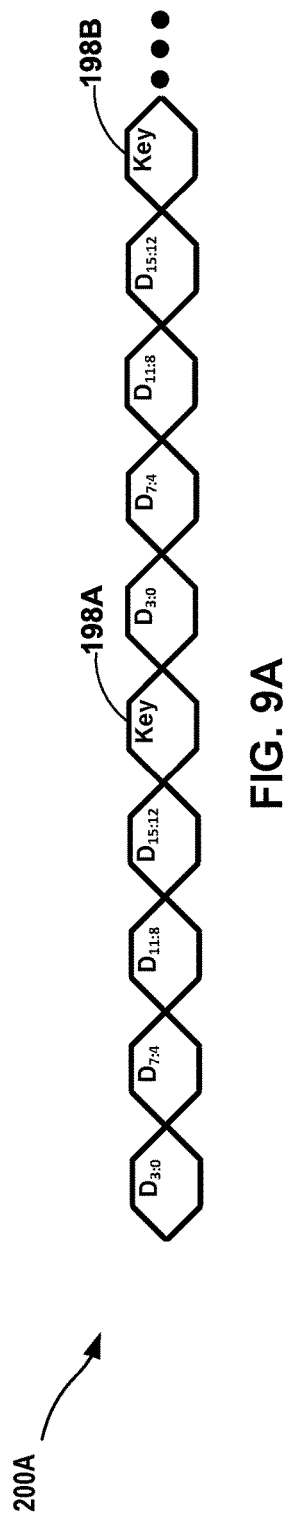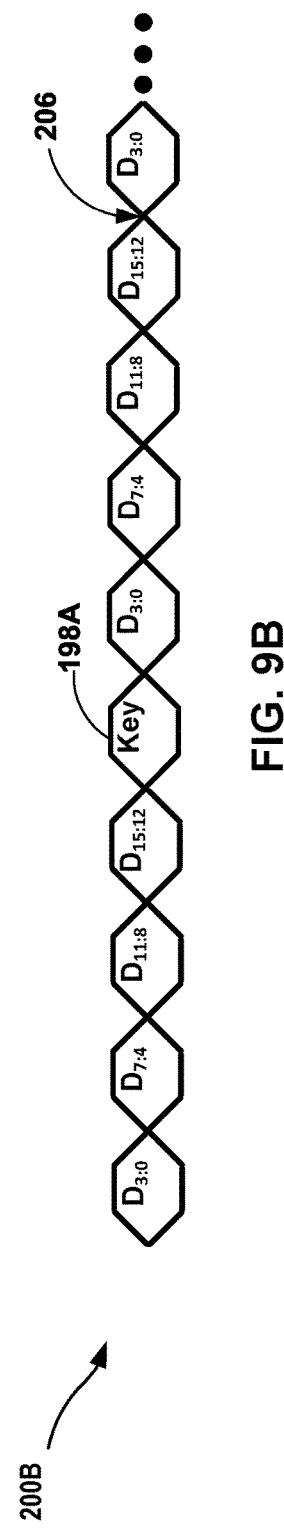
FIG. 9A
FIG. 9B

ENCRYPTION AND DECRYPTION ENGINES WITH SELECTIVE KEY EXPANSION SKIPPING

This application claims the benefit of U.S. Provisional Patent Application No. 62/935,948 filed on 15 Nov. 2019, the entire contents of which are incorporated by reference herein.

TECHNICAL FIELD

This disclosure generally relates to data encryption and decryption implemented in various types of computing systems.

BACKGROUND

Many computing systems incorporate content protection or digital rights management technology that includes data encryption and decryption hardware and software. This encryption protects secure data, which is potentially sensitive, private, and/or right-managed and is stored or used on the system, from unauthorized access and exploitation. Examples of computing systems that incorporate encryption and decryption include artificial reality systems. In general, artificial reality is a form of reality that has been adjusted in some manner before presentation to a user, which may include, e.g., a virtual reality, an augmented reality, a mixed reality, a hybrid reality, or some combination and/or derivatives thereof. Artificial reality systems include one or more devices for rendering and displaying content to users. Examples of artificial reality systems may incorporate a head-mounted display (HMD) worn by a user and configured to output artificial reality content to the user. In some examples, the HMD may be coupled (e.g. wirelessly or in tethered fashion) to a peripheral device that performs one or more artificial reality-related functions.

SUMMARY

In general, this disclosure is directed to encryption and decryption engines configured to skip key expansion in certain scenarios in order to improve throughput while reducing power consumption. This disclosure is related to systems on a chip (SoCs) that communicate with each other using encrypted data. With respect to cross-SoC traffic, each SoC of this disclosure implements encryption with respect to egress traffic and decryption with respect to ingress traffic. The SoCs of this disclosure communicate encrypted data in the form of crypto packets, each of which traverses a path identified by a "channel ID." The channel ID corresponds to a {source, destination} tuple for the respective crypto packet, at a subsystem-level granularity. That is, each of the source and destination information indicates a particular subsystem of the sending SoC and the destination SoC, respectively. The SoCs of this disclosure tunnel encrypted traffic by selecting a unique encryption key (in the case of egress traffic) and a unique decryption key (in the case of ingress traffic) on a per-channel ID basis. That is, the SoCs of this disclosure implement multi-key encryption and multi-key decryption, while maintaining key unity across traffic of a given channel ID.

Encryption and decryption engines of this disclosure leverage this in-channel key unity to increase encryption and decryption throughput. Because the same key is used for all ingress traffic on a particular channel ID or for all egress traffic on a particular channel ID, the encryption and decryption engines of this disclosure perform certain key-based operations only for the first data segment being encrypted/decrypted along a particular channel ID, and opportunistically skip these key-based operations for all successive data segments processed for the same channel ID, for as long as the encryption/decryption engine does not encounter any channel ID discontinuity in the data segment stream.

The SoCs of this disclosure provide several technical improvements. By exploiting the channel ID-driven key unity among consecutive data segments undergoing encryption/decryption to opportunistically skip key-based operations for all except the first data segment of the consecutive series, the encryption and decryption engines of this disclosure maintain encryption/decryption precision, while increasing throughput. In some use case scenarios, the encryption and decryption engines of this disclosure reduce resource expenditure for key-based encryption/decryption operations by as much as 20% for consecutive data segments processed after the first data segment of a channel ID-contiguous flow. In some examples, SoCs of this disclosure implement lightweight encryption and decryption engines, which reduce the hardware infrastructure required for encryption and decryption, with the improved throughput provided by the opportunistic operation reduction described above.

In one example, this disclosure is directed to a system on a chip (SoC). The SoC includes a security processor configured to determine that a first channel ID describing a {source, destination} tuple for a crypto packet matches a second channel ID describing a corresponding {source, destination} tuple for a preceding crypto packet received immediately prior to the crypto packet. The SoC also includes a decryption engine configured to, responsive to the determination that the first channel ID matches the second channel ID: obtain a set of round keys applied to perform an add round key computational stage of a previous decryption datapath used to decrypt a preceding cipher text block obtained from the preceding crypto packet, and to reuse the set of round keys to perform a corresponding add round key computational stage of a current decryption datapath used to decrypt a cipher text block obtained from the crypto packet.

In another example, this disclosure is directed to an SoC. The SoC includes a security processor configured to determine that a first channel ID describing a {source, destination} tuple for a crypto packet matches a second channel ID describing a corresponding { source, destination} tuple for a preceding crypto packet transmitted immediately prior to the crypto packet. The SoC also includes an encryption engine configured to, responsive to the determination that the first channel ID matches the second channel ID: obtain a set of round keys applied to perform an add round key computational stage of a previous encryption datapath used to encrypt a preceding input block to form a preceding cipher text block encapsulated in the preceding crypto packet, and to reuse the set of round keys to perform a corresponding add round key computational stage of a current encryption datapath used to encrypt an input block to form a cipher text block to be encapsulated in the crypto packet . . . .

In another example, this disclosure is directed to an artificial reality system. The artificial reality system includes a head-mounted device (HMD) that includes an HMD system on a chip (SoC). The HMD SoC includes an ingress interface configured to receive a crypto packet. The HMD SoC also includes a security processor configured to determine that a first channel ID describing a {source, destination} tuple for the crypto packet matches a second channel ID describing a corresponding {source, destination} tuple for a preceding crypto packet received immediately prior to the crypto packet. The HMD SoC also includes a decryption engine configured to, responsive to the determination that the first channel ID matches the second channel ID: obtain a set of round keys applied to perform an add round key computational stage of a previous decryption datapath used to decrypt a preceding cipher text block obtained from the preceding crypto packet, and to reuse the set of round keys to perform a corresponding add round key computational stage of a current decryption datapath used to decrypt a cipher text block obtained from the crypto packet.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIGS. 9A & 9B are conceptual diagrams illustrating the throughput improvements of this disclosure in a comparative manner.

DETAILED DESCRIPTION

Figure 1A:
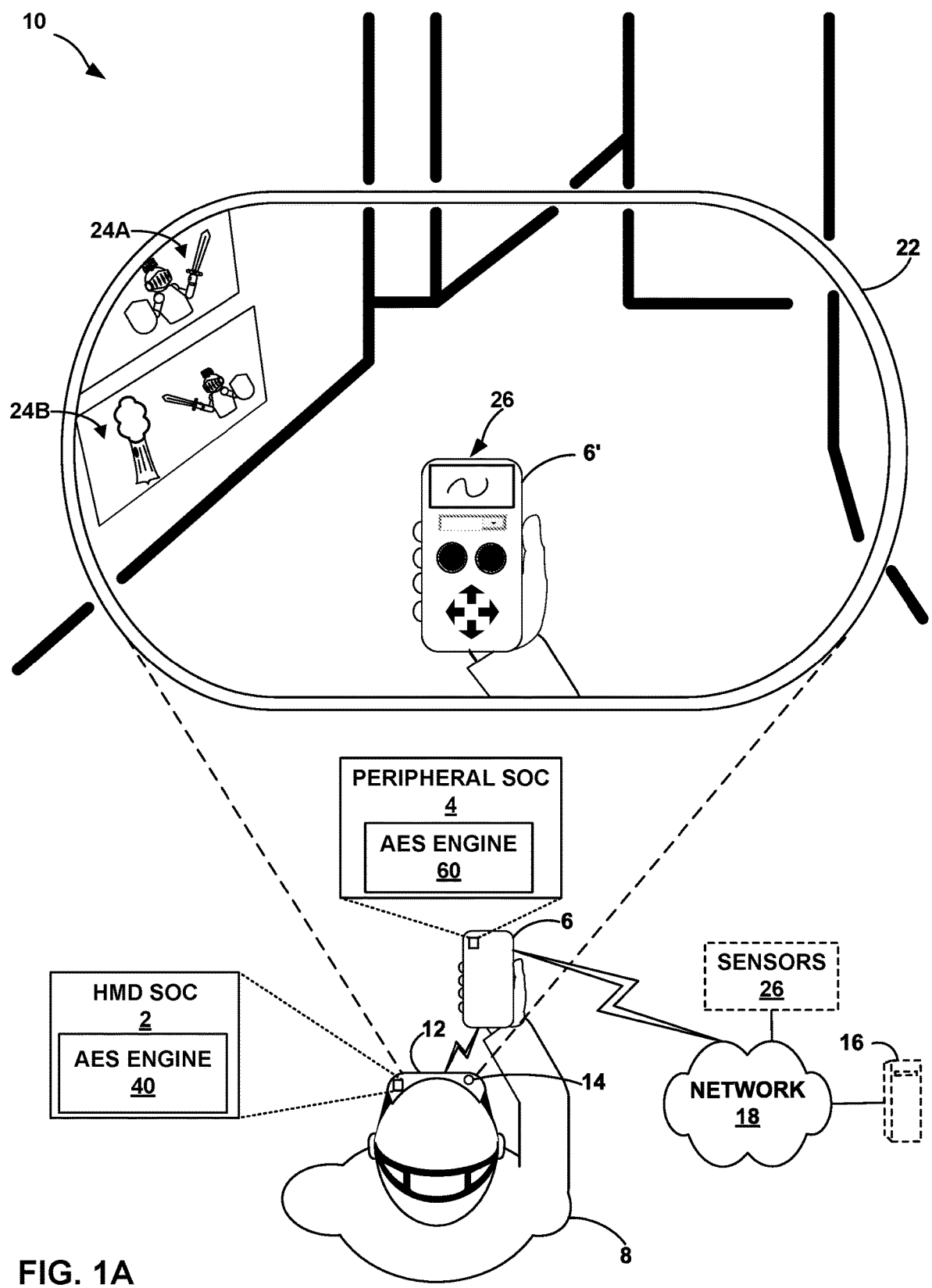
FIG. 1A is an illustration depicting an example multi-device artificial reality system, components of which are configured to implement increased-throughput encryption and decryption datapaths of this disclosure.

Multi-device systems sometimes incorporate content protection or digital rights management technology, such as data encryption and decryption, as part of in-system, inter-device communications. A source device that originates an encrypted communication within the system may implement digital data encryption according to various standardized encryption mechanisms. A destination device that receives the encrypted communication for processing beyond simple relaying performs generally reciprocal or "inverse" steps with respect to the encryption mechanisms, in accordance with the inverse steps specified in the corresponding standard according to which the data was encrypted.

Encrypted inter-device communications are often performed in a packetized manner. The packetized communications are packaged as discrete data units (or "packets"), with each packet conforming to a format/structure. Packets of an inter-device encrypted data flow are referred to herein as "crypto packets." Each crypto packet conforms to a format in which an encrypted payload is encapsulated within an "encryption header." Various non-limiting examples of this disclosure are described with respect to peer-to-peer (P2P) unicast data flows between two devices of a multi-device artificial reality system.

Artificial reality systems are becoming increasingly ubiquitous with applications in many fields such as computer gaming, health and safety, industrial fields, and education. As a few examples, artificial reality systems are being incorporated into mobile devices, gaming consoles, personal computers, movie theaters, and theme parks. In general, artificial reality is a form of reality that has been adjusted in some manner before presentation to a user, and may include one or more of virtual reality (VR), augmented reality (AR), mixed reality (MR), hybrid reality, or some combination and/or derivative thereof.

Typical artificial reality systems include one or more devices for rendering and displaying content to users. As one example, a multi-device artificial reality system of this disclosure may include a head-mounted device (HMD) worn by a user and configured to output artificial reality content to the user, and a peripheral device that operates as a co-processing device when paired with the HMD. The artificial reality content may include completely generated content or generated content combined with captured content (e.g., real-world video and/or real-world images). The peripheral device and the HMD may each include one or more SoC integrated circuits (referred to herein simply as "SoCs") that are collectively configured to provide an artificial reality application execution environment.

Because the HMD and peripheral device communicate secure data (e.g., authentication data) with each other, the respective SoCs of the HMD and the peripheral device send data to one another in the form of crypto packets. That is, the sending SoC encrypts raw (or "plain text") data before transmission, and the receiving SoC decrypts encrypted data after receipt. The SoCs of this disclosure are configured to perform encryption and decryption in an increased-throughput manner, while maintaining data precision and reducing computing resource overhead.

More specifically, the SoCs of this disclosure leverage the reuse of a single cipher key (in the case of encryption) or a single inverse cipher key (in the case of decryption) for contiguous data streams flowing from a single subsystem of the source SoC to a single system of the destination SoC to eliminate redundant key expansion operations after the first data segment of the contiguous flow is encrypted/decrypted. By eliminating the redundant key expansion operations for these subsequent data segments, the SoCs of this disclosure reduce the computational overhead of key-based operations in encrypting/decrypting these data segments significantly, sometimes by a margin of 20%.

Contiguous crypto packet streams on a single channel ID are often quite large, sometimes having sizes in the order of gigabytes. Particularly in these examples, a 20% operational reduction for key-based encryption/decryption operations for all except the first data segment provides a significant computational resource saving. Additionally, because of the improved throughput of the encryption and decryption datapaths of this disclosure in a given period of time, the SoCs of this disclosure incorporate reduced-hardware implementations of the encryption and decryption engines, thereby reducing hardware overhead, as well.

FIG. 1A is an illustration depicting a multi-device artificial reality system 10, components of which are configured to implement increased-throughput encryption and decryption datapaths of this disclosure. More specifically, components of multi-device artificial reality system 10 incorporate SoCs configured to implement modified encryption and decryption datapaths of this disclosure in instances in which contiguous crypto packet flows are assigned the same channel ID. The modified encryption and decryption datapaths implemented by the components of multi-device artificial reality system 10 bypass key expansion operations, which may represent 20% of the operational overhead of the key-based computational stage of the respective datapath, for all except the first crypto packet of a contiguous crypto packet flow sent/received over a particular channel ID.

Additionally, the SoCs of the encryption/decryption-enabled components of multi-device artificial reality system 10 incorporate reduced-hardware implementations of the encryption and decryption engines, in comparison to standard-defined encryption and decryption engines. In some examples, the SoCs of these components of multi-device artificial reality system 10 incorporate encryption engines and decryption engines that provide a 75% reduction of hardware overhead as compared to the standard-defined encryption and decryption hardware.

Multi-device artificial reality system 10 includes a head-mounted device (HMD) 12 and a peripheral device 6. As shown, HMD 12 is typically worn by a user 8. HMD 12 typically includes an electronic display and optical assembly for presenting artificial reality content 22 to user 8. In addition, HMD 12 includes one or more sensors (e.g., accelerometers) for tracking motion of HMD 12. HMD 12 may include one or more image capture devices 14, e.g., cameras, line scanners, fundal photography hardware, or the like. Image capture devices 14 may be configured for capturing image data of the surrounding physical environment. In some examples, image capture devices 14 include inward-facing camera hardware and/or scanning hardware configured to capture facial images, retina scans, iris scans, etc. of user 8 for user authentication and for other purposes.

HMD 12 is shown in this example as being in communication with (e.g., in wireless communication with or tethered to) peripheral device 6. Peripheral device 6 represents a co-processing device in communication with HMD 12. HMD 12 and/or peripheral device 6 may execute an artificial reality application to construct artificial reality content 22 for display to user 8. For example, HMD 12 and/or peripheral device 6 may construct the artificial reality content based on tracking pose information and computing pose information for a frame of reference, typically a viewing perspective of HMD 12.

As shown in FIG. 1A, one or more devices of multi-device artificial reality system 10 may be connected to a computing network, such as network 18. Network 18 may incorporate a wired network and/or wireless network, such as a local area network (LAN), a wide area network (WAN), a Wi-Fi™ based network or 5G network, an Ethernet® network, a mesh network, a short-range wireless (e.g., Bluetooth®) communication medium, and/or various other computer interconnectivity infrastructures and standards. Network 18 may support various levels of network access, such as to public networks (e.g., the Internet), to private networks (e.g., as may be implemented by educational institutions, enterprises, governmental agencies, etc.), or private networks implemented using the infrastructure of a public network (e.g., a virtual private network or "VPN" that is tunneled over the Internet).

FIG. 1A also illustrates various optional devices that may be included in multi-device artificial reality system 10 or coupled to multi-device artificial reality system 10 via network 18. The optional nature of these devices is shown in FIG. 1A by way of dashed-line borders. One example of an optional device shown in FIG. 1A is console 16. In implementations that include console 16, console 16 may communicate directly with HMD 12, and/or with peripheral device 6 (and thereby, indirectly with HMD 12) to process artificial reality content that HMD 12 outputs to user 8. Another example of optional hardware shown in FIG. 1A is represented by external sensors 26. Multi-device artificial reality system 10 may use external sensors 26 and/or external camera hardware to capture three-dimensional (3D) information within the real-world, physical environment at which user 8 is positioned.

In general, multi-device artificial reality system 10 uses information captured from a real-world, 3D physical environment to render artificial reality content 22 for display to user 8. In the example of FIG. 1A, user 8 views the artificial reality content 22 constructed and rendered by an artificial reality application executing on the combination of HMD 12 peripheral device 6. In some examples, artificial reality content 22 may comprise a combination of real-world imagery (e.g., peripheral device 6 in the form of peripheral device representation 6', representations of walls at the physical environment at which user 8 is presently positioned, a representation of the hand with which user 8 holds peripheral device 6, etc.) overlaid with virtual objects (e.g., virtual content items 24A and 24B, virtual user interface 26, etc.) to produce an augmented reality experience or a mixed reality experience displayed to user 8 via display hardware of HMD 12.

In some examples, virtual content items 24A and 24B (collectively, virtual content items 24) may be mapped to a particular position within artificial reality content 22. As examples, virtual content items 24 may be pinned, locked, or placed to/at certain position(s) within artificial reality content 22. A position for a virtual content item may be fixed, as relative to one of the walls of the real-world imagery reproduced in artificial reality content 22, or to the earth, as examples. A position for a virtual content item may be variable, as relative to peripheral device representation 6' or to the tracked gaze or field of view (FoV) of user 8, as non-limiting examples. In some examples, the particular position of a virtual content item within artificial reality content 22 is associated with a position within the real-world, physical environment (e.g., on a surface of a physical object) at which user 8 is positioned presently.

In this example, peripheral device 6 is a physical, real-world device having a surface on which the artificial reality application executing on computing platforms of multi-device artificial reality system 10 overlays virtual user interface 26. Peripheral device 6 may include one or more presence-sensitive surfaces for detecting user inputs by detecting a presence of one or more objects (e.g., fingers, stylus) touching or hovering over locations of the presence-sensitive surface. In some examples, peripheral device 6 may include one or more output devices, such as a display integrated into the presence-sensitive surface to form an input/output (I/O) component of peripheral device 6.

In some examples, peripheral device 6 may have the form factor of various portable devices, such as a smartphone, a tablet computer, personal digital assistant (PDA), or other handheld device. In other examples, peripheral device 6 may have the form factor of various wearable devices, such as a so-called "smartwatch," "smart ring," or other wearable device. In some examples, peripheral device 6 may be part of a kiosk or other stationary or mobile system. While described above as integrating display hardware, peripheral device 6 need not include display hardware in all implementations.

In the example artificial reality experience shown in FIG. 1A, virtual content items 24 are mapped to positions on a visual representation of a wall of the real-world physical environment at which user 8 is positioned. The example in FIG. 1A also shows that virtual content items 24 partially appear on the visual representation of the wall only within artificial reality content 22, illustrating that virtual content items 24 do not represent any items that exist in the real-world, physical environment at which user 8 is positioned. Virtual user interface 26 is mapped to a surface of peripheral device 6 as represented in peripheral device representation 6'. Multi-device artificial reality system 10 renders virtual user interface 26 for display via HMD 12 as part of artificial reality content 22, at a user interface position that is locked relative to the position of a particular surface of peripheral device 6.

FIG. 1A shows that virtual user interface 26 appears overlaid on peripheral device representation 6' (and therefore, only within artificial reality content 22), illustrating that the virtual content represented in virtual user interface 26 does not exist in the real-world, physical environment at which user 8 is positioned. Multi-device artificial reality system 10 may render one or more virtual content items in response to a determination that at least a portion of the location of virtual content items is in the FoV of user 8. For example, multi-device artificial reality system 10 may render virtual user interface 26 on peripheral device 6 only if peripheral device 6 is within the FoV of user 8.

Various devices of multi-device artificial reality system 10 may operate in conjunction in the artificial reality environment, such that each device may be a separate physical electronic device and/or separate integrated circuits within one or more physical devices. In this example, peripheral device 6 is operationally paired with HMD 12 to jointly operate to provide an artificial reality experience. For example, peripheral device 6 and HMD 12 may communicate with each other as co-processing devices. As one example, when a user performs a user interface-triggering gesture in the virtual environment at a location that corresponds to one of the virtual user interface elements of virtual user interface 26 overlaid on peripheral device representation 6', multi-device artificial reality system 10 detects the user interface and performs an action that is rendered and displayed via HMD 12.

Each of peripheral device 6 and HMD 12 may include one or more SoC integrated circuits configured to support aspects of the artificial reality application described above, such as SoCs operating as co-application processors, encryption engines, decryption engines, sensor aggregators, display controllers, etc. Although each of peripheral device 6 and HMD 12 may include multiple SoCs, FIG. 1A only illustrates HMD SoC 2 of HMD 12 and peripheral SoC 4 of peripheral device 6, for ease of illustration and discussion. To preserve security and digital rights, HMD SoC 2 and peripheral SoC 4 are configured to communicate with one another using encrypted data streams, such as by sending crypto packet flows over a wireless link formed using respective peripheral component interface (PCI) express (PCIe) buses of HMD SoC 2 of HMD 12 and peripheral SoC 4.

To encrypt egress data before transmission to peripheral SoC 4 and to decrypt ingress data after receipt from peripheral SoC 4, HMD SoC 2 invokes AES engine 40. To encrypt egress data before transmission to HMD SoC 2 and to decrypt ingress data after receipt from HMD SoC 2, peripheral SoC 4 invokes AES engine 60. As one example, HMD SoC 2 may encrypt facial images, retina scans, iris scans, etc. of user 8 (e.g., as captured by inward-facing camera hardware and/or fundal photography hardware of image capture devices 14), and send the encrypted data to peripheral SoC 4 for authentication purposes and optionally, for other purposes as well. In this example, peripheral SoC 4 may decrypt the encrypted data received from HMD SoC 2, and process the decrypted data using facial recognition technology, retinal blood vessel pattern recognition technology, etc. to grant/deny biometric authentication to user 8. AES engine 40 includes an encryption engine and a decryption engine implemented separately in silicon. AES engine 60 includes an encryption engine and a decryption engine implemented separately in silicon.

AES engines 40, 60 are described herein as performing encryption and decryption operations that comply with the standardized encryption and decryption mechanisms described in the advanced encryption standard (AES) established by the United States National Institute of Standards and Technology (NIST) as a non-limiting example. It will be appreciated that HMD SoC 2 and peripheral SoC 4 may, in other examples, include encryption engines and decryption engine that implement the throughput enhancements of this disclosure while complying with other cipher standards, such as SM4 (formerly SMS4, a block cipher standard set forth in the Chinese National Standard for Wireless LAN WAPI), Camellia (developed by Mitsubishi Electric and NTT Corporation of Japan), etc. The opportunistic key expansion skipping techniques of this disclosure can be implemented in digital logic, and are therefore sufficiently scalable and polymorphic to provide improved throughput within the compliance boundaries of various types of encryption and decryption engines, such as those that comply with the standards listed above and other standardized or non-standardized decryption engines.

While the throughput-enhancing encryption and decryption techniques of this disclosure are described with respect to being implemented within multi-device artificial reality system 10 as an example, it will be appreciated that the applicability of the techniques of this disclosure are not limited to artificial reality systems. The data communication techniques of this disclosure can also be implemented to improve data security in other types of computing devices, including, but not limited to, various types of battery-powered SoC-driven and/or application specific integrated circuit (ASIC)-driven technologies.

HMD SoC 2 and peripheral SoC 4 implement the techniques of this disclosure to identify crypto packet flows between one another at a subsystem-to-subsystem level of granularity. For example, HMD SoC 2 may identify each outgoing crypto packet based on a tuple including the particular subsystem of HMD SoC 2 that originated the crypto packet and the particular subsystem of peripheral SoC 4 that is the destination of the crypto packet. Similarly, peripheral SoC 4 may identify each outgoing crypto packet based on a tuple including the particular subsystem of peripheral SoC 4 that originated the crypto packet and the particular subsystem of HMD SoC 2 that is the destination of the crypto packet. The {source subsystem, destination subsystem} tuple is referred to herein as a "channel ID." AES engines 40, 60 are configured to use the same encryption key for encryption of all egress crypto packets along a given channel ID, and to use the same decryption key for decryption of ingress crypto packets along a given channel ID. AES engines 40, 60 map the encryption keys and decryption keys (collectively, "base keys") to the channel IDs on a one-to-one basis. That is, no two channel IDs share the same base key.

Encryption and decryption according to the AES are pipelined processes with multiple computational stages, as will be described below in greater detail, with respect to FIG. 5. A prerequisite to one of the computational stages (referred to as the "add round key" step) is an operation known as "key expansion." Key expansion involves the derivation of multiple versions of the base key selected for encryption/decryption of the data segment being processed currently. The AES encryption or decryption operation involves ten rounds/iterations. Each round starts with an "add round key" operation. The ten add round key operations require ten unique keys that are derived from the base key. Derivation of these intermediate keys from the base key involves steps that are comparably compute intensive to encrypting/decrypting data with these keys.

Under the AES, the key expansion operations do not change for the same base key, irrespective of how many times the same base key is reused for different input data segments. Again, AES engines 40, 60 are configured to encrypt/decrypt the cross-SoC communications between HMD SoC 2 and peripheral SoC 4 using a single base key for all data communicated along a single channel ID. As such, key expansion represents a redundant operation with respect to all data along a single channel ID, because the same modified versions of the channel ID-selected base key are derived to maintain AES compliance.

Moreover, cross-SoC communications between HMD SoC 2 and peripheral SoC 4 often include uninterrupted sequences (or streams) of data segments, sometimes in the order of megabytes or even gigabytes. For this reason, once AES engine 40 or AES engine 60 performs key expansion for the first data segment being processed along a given channel ID, the same ten versions of the base key can be reused for all subsequent data segments processed along the same channel ID before a channel ID transition.

According to aspects of this disclosure, AES engines 40, 60 are configured to bypass key expansion operations for contiguous, subsequent data segments being encrypted/decrypted on a given channel ID after the first data segment on that particular channel ID is encrypted/decrypted. More specifically, AES engines 40, 60 may reuse the same base key and the same derivations thereof for all contiguous, subsequent data segments on a channel ID after performing key expansion for the first data segment of the contiguous sequence of data segments encrypted/decrypted along that particular channel ID.

In this way, AES engines 40, 60 leverage in-channel key unity to reduce operational overhead during encryption and decryption of cross-SoC traffic between HMD SoC 2 and peripheral SoC 4. In the example of encryption/decryption being performed with respect to 128-bit data segments, key expansion represents 10 cycles out of a total of 50 cycles of the round key addition computational stage. Thus, AES engines 40, 60 reduce the round key addition stage's resource usage by 20% for non-initial data segments of a contiguous series of data segments encrypted/decrypted on a single channel ID, according to the techniques of this disclosure. When applied over longer data streams, such as those that are sized in the order of several hundred megabytes or in the order of gigabytes, this 20% reduction in operational overhead provides a significant throughput improvement while maintaining AES compliance with respect to the cipher text output via encryption and the raw data output via decryption.

According to aspects of this disclosure, each of AES engines 40, 60 is implemented using a reduced hardware infrastructure. In some examples, each of AES engines 40, 60 is implemented using a "quarter round" hardware infrastructure. That is, each of AES engines 40, 60 implements a reduced-size encryption datapath and reduced-size decryption datapath that requires a hardware infrastructure that is 25% the size of AES-specified infrastructures. The throughput improvements provided by the opportunistic key expansion skipping of this disclosure enable these reduced-hardware infrastructures of AES engines 40, 60, thereby reducing hardware overhead required to maintain security in cross-SoC communications between HMD SoC 2 and peripheral SoC 4. The reduced hardware overhead requirements of this disclosure enable low-profile designs with respect to HMD 12 and/or peripheral device 6, and may also enable more efficient energy usage for encryption and decryption purposes.

Figure 1B:
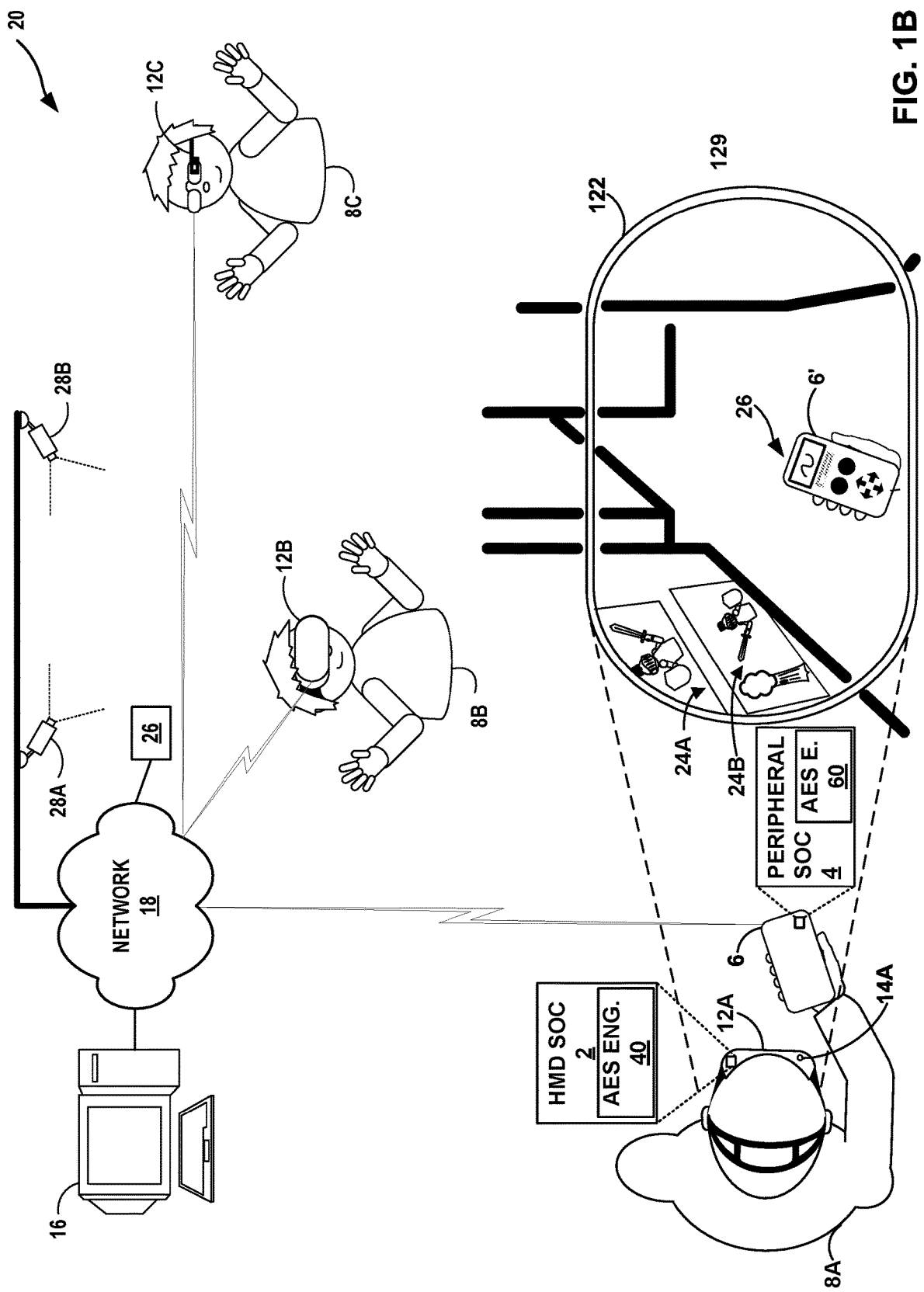
FIG. 1B is an illustration depicting another example multi-device artificial reality system that includes components configured to implement increased-throughput encryption and decryption datapaths of this disclosure.

FIG. 1B is an illustration depicting another example multi-device artificial reality system 20 that includes components configured to implement increased-throughput encryption and decryption datapaths of this disclosure. Similar to multi-device artificial reality system 10 of FIG. 1A, HMD SoC 2 and peripheral SoC 4 included, respectively, in HMD 12A and peripheral device 6 of FIG. 1B may tunnel crypto packet traffic between each other on a per-channel ID basis, using channel ID-unique keys for encryption and decryption operations. AES engines 40, 60 of HMD SoC 2 and peripheral SoC 4 improve encryption and decryption throughput by opportunistically bypassing key expansion operations for all non-first data segments of a contiguous series of data segments on a single channel ID, in accordance with aspects of this disclosure. Additionally, each of AES engines 40, 60 is implemented according to a quarter-round hardware infrastructure according to aspects of this disclosure, thereby reducing the hardware requirements to maintain AES compliance and communication security between HMD SoC 2 and peripheral SoC 4.

In the example of FIG. 1B, multi-device artificial reality system 20 includes external cameras 28A and 28B (collectively, "external cameras 28"), HMDs 12A-12C (collectively, "HMDs 12"), console 16, and sensors 26. As shown in FIG. 1B, multi-device artificial reality system 20 represents a multi-user environment in which an artificial reality application executing on console 16 and/or HMDs 12 presents artificial reality content to each of users 8A-8C (collectively, "users 8") based on a current viewing perspective of a corresponding frame of reference for the respective user 8. That is, in this example, the artificial reality application constructs artificial reality content by tracking and computing pose information for a frame of reference for each of HMDs 12. Multi-device artificial reality system 20 uses data received from external cameras 28 and/or HMDs 12 to capture 3D information within the real-world environment, such as motion by users 8 and/or tracking information with respect to users 8, for use in computing updated pose information for a corresponding frame of reference of HMDs 12.

HMDs 12 operate concurrently within multi-device artificial reality system 20. In the example of FIG. 1B, any of users 8 may be a "player" or "participant" in the artificial reality application, and any of users 8 may be a "spectator" or "observer" in the artificial reality application. HMDs 12 of FIG. 1B may each operate in a substantially similar way to HMD 12 of FIG. 1A. For example, HMD 12A may operate substantially similar to HMD 12 of FIG. 1A, and may receive user inputs by tracking movements of the hands of user 8A.

Each of HMDs 12 implements a respective user-facing artificial reality platform (or co-implements the platform with a co-processing device, as in the case of HMD 12A with peripheral device 6), and outputs respective artificial content, although only artificial reality content 22 output by HMD 12A is shown in FIG. 1B, purely for the purpose of ease of illustration. As shown in FIG. 1B, two or more of HMDs 12 may, but need not necessarily, conform to the same form factor. Various form factors of HMDs 12 are shown in FIG. 1B, including a goggle form factor and an eyeglass form factor. In some use case scenarios, HMDs 12B and/or 12C may also be paired (e.g. wirelessly coupled or tethered to) a portable device that implements generally corresponding features to those described with respect to peripheral device 6.

Figure 2:
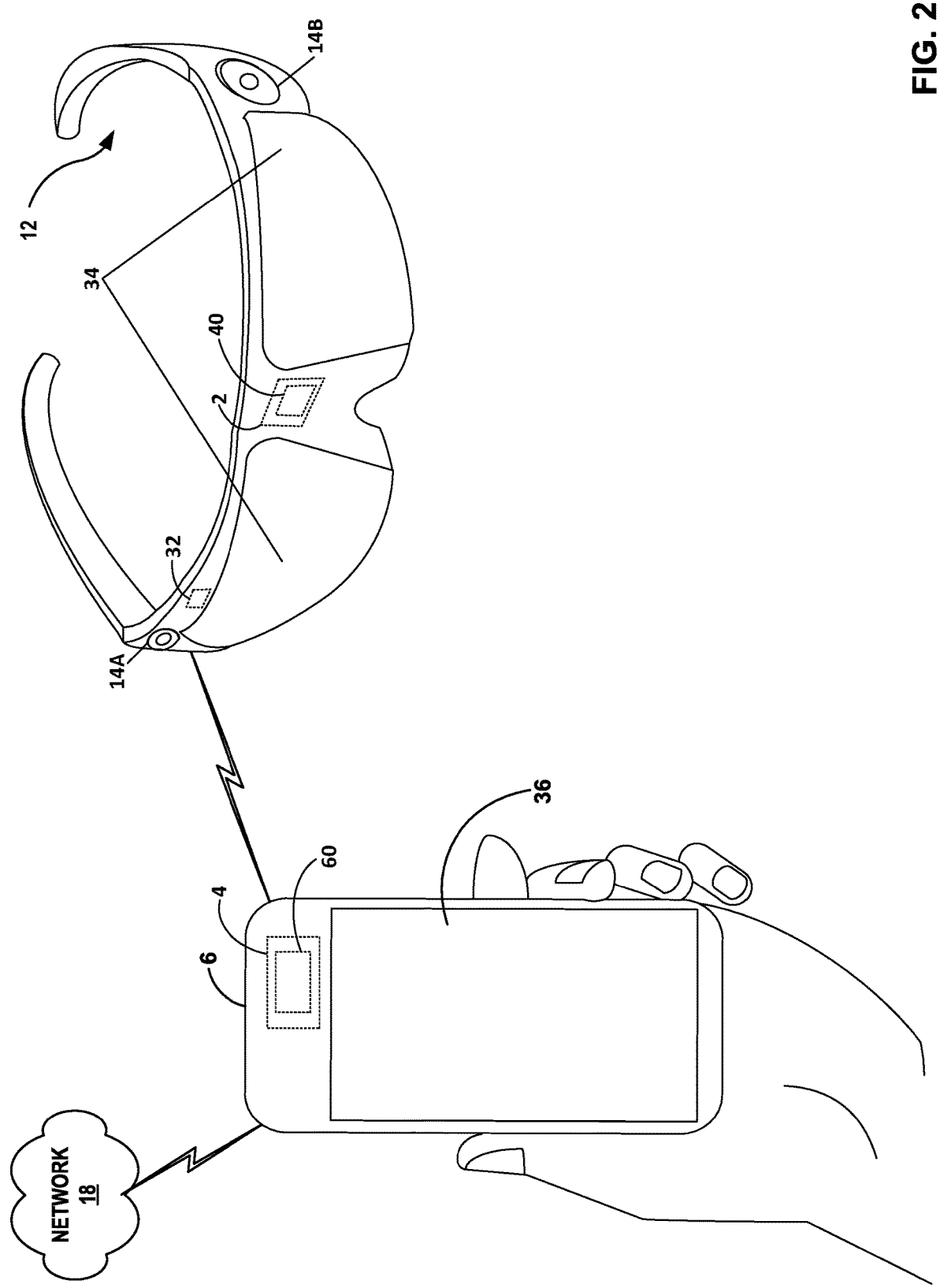
FIG. 2 is an illustration depicting an example of the head-mounted device (HMD) of FIG. 1A in communication with the peripheral device of FIG. 1A, according to aspects of the disclosure.

FIG. 2 is an illustration depicting an example of HMD 12 in communication with peripheral device 6 according to aspects of the disclosure. HMD 12 of FIG. 2 may be an example of any of HMDs 12 of FIGS. 1A and 1B. In some examples, HMD 12 and peripheral device 6 may be part of an artificial reality system that incorporates other devices and network intermediaries, such as in the examples of artificial reality systems 10 and 20 illustrated in FIGS. 1A and 1B. In other examples, HMD 12 and peripheral device 6 may operate as a tandem, mobile artificial realty system configured to implement secure data communication with the throughput-enhancing features of this disclosure.

In this example, HMD 12 includes a front rigid body and two stems to secure HMD 12 to user 8 e.g., by resting over the ears of user 8. In addition, HMD 12 includes an interior-facing electronic display 34 configured to present artificial reality content to user 8. Electronic display 34 may include, be, or be part of any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, electronic display 34 includes a stereoscopic display for providing separate images to each eye of user 8. In some examples, the known orientation and position of display 34 relative to the front rigid body of HMD 12 is used as a frame of reference, also referred to as a local origin, when tracking the position and orientation of HMD 12 for rendering artificial reality content according to a current viewing perspective of HMD 12 and user 8.

HMD 12 takes the form factor of eyeglasses in the example of FIG. 2. In some examples, electronic display 34 may be split into multiple segments, such as into two segments, with each segment corresponding to a separate lens disposed on the rigid front body of HMD 12. In other examples in accordance with FIG. 2, electronic display 34 may form a contiguous surface that spans both lenses and the lens-connecting bridge (i.e., the over-the-nose portion) of the rigid front body of HMD 12. In some examples in accordance with the form factor illustrated in FIG. 2, electronic display 34 may also encompass portions of HMD 12 that connect the lenses of the front rigid body to the stems, or optionally, portions of the stems themselves. These various designs of electronic display 34 in the context of the form factor of HMD 12 shown in FIG. 2 improve accessibility for users having different visual capabilities, eye movement idiosyncrasies, etc. In other examples, HMD 12 may take other form factors, such as the general form factor of a headset or goggles equipped with a band to secure HMD 12 to the head of user 8.

In the example illustrated in FIG. 2, HMD 12 further includes one or more motion sensors 32, such as one or more accelerometers (also referred to as inertial measurement units or "IMUs") that output data indicative of current acceleration of HMD 12, GPS sensors that output data indicative of a location of HMD 12, radar, or sonar that output data indicative of distances of HMD 12 from various objects, or other sensors that provide indications of a location or orientation of HMD 12 or other objects within a physical environment. In the example illustrated in FIG. 2, HMD 12 includes integrated image capture devices 14A and 14B (collectively, "image capture devices 14"). Image capture devices 14 may include still image camera hardware, video camera hardware, laser scanners, Doppler® radar scanners, fundus photography hardware, infrared imaging cameras, depth scanners, or the like. Image capture devices 14 may include outward-facing and/or inward-facing image capture hardware, and include any hardware configured to capture image data representative of a surrounding physical environment, and optionally, to preprocess and/or post process the captured image data. Outward-facing camera hardware of image capture devices 14 may capture image data of the physical environment outside of HMD 12, such as, but not limited to, the real-world environment at which user 8 is positioned. Inward-facing camera hardware of image capture devices 14 may capture image data of wearer of HMD 12, such as facial images and/or retina scans and/or temperature information of user 8.

Again HMD 12 is in communication example peripheral device 6 in the example of FIG. 2. Peripheral device 6 may be communicatively coupled to HMD 12 in a number of ways, such as over a wireless communication links (e.g., Wi-Fi™, near-field communication of short-range wireless communication such as Bluetooth®, etc.) or a wired communication link or tethered connection, or any combination thereof. Peripheral device 6 may receive and send data over network 18, and may thereby function as a network interface of the artificial reality system that includes or is formed by the combination peripheral device 6 with HMD 12. Surface 36 of peripheral device 6 represents an input component or a combined input/output component of peripheral device 6. Surface 36 may include sensing capabilities, such as those of a touchscreen (e.g., a capacitive touchscreen, resistive touchscreen, surface acoustic wave (SAW) touchscreen, infrared touchscreen, optical imaging touchscreen, acoustic pulse recognition touchscreen, or any other touchscreen), touchpad, buttons, trackball, scroll wheel, or other presence-sensitive hardware that uses capacitive, conductive, resistive, acoustic, or other technology to detect touch and/or hover input.

Surface 36 may enable peripheral device 6 to receive touch input or gesture input without direct contact with surface 36. User 8 may provide these touch or gesture inputs to peripheral device 6 to provide instructions directly to peripheral device 6, or indirectly to HMD 12 and/or other components of an artificial reality system in which HMD 12 is deployed. In some examples, processing circuitry of HMD 12 may utilize image capture devices 14 to analyze configurations, positions, movements, and/or orientations of peripheral device 6, of the hand(s) or digit(s) thereof of user 8 to enable to provide input using gestures such as drawing gestures or typing gestures provided via a graphical keyboard.

In this way, peripheral device 6 may offload various hardware and resource burdens from HMD 12, which enables low-profile form factor designs of HMD 12. Peripheral device 6 also serves as a communications intermediary between HMD 12 and devices at remote locations, via network 18 in some examples, while peripheral device 6 may also be coupled to HMD 12 in some scenarios in which HMD 12 is configured to communicate directly over network 18 as well. Additional details of peripheral device 6 are described in U.S. patent application Ser. No. 16/506,618 (filed on 9 Jul. 2019), the entire content of which is incorporated herein by reference. HMD 12 includes HMD SoC 2, and peripheral device 6 includes peripheral SoC 4. HMD SoC 2 and peripheral SoC 4 are communicatively coupled over the communicative connection between HMD 12 and peripheral device 6.

As also shown in FIGS. 1A & 1B, HMD SoC 2 includes AES engine 40 and peripheral SoC 4 includes AES engine 60. HMD SoC 2 and peripheral SoC 4 included in HMD 12 and peripheral device 6, respectively, may tunnel crypto packet traffic between each other on a per-channel ID basis, using channel ID-unique keys for encryption and decryption operations. AES engines 40, 60 of HMD SoC 2 and peripheral SoC 4 improve encryption and decryption throughput by opportunistically bypassing key expansion operations for all non-first data segments of a contiguous series of data segments on a single channel ID, in accordance with aspects of this disclosure. Additionally, each of AES engines 40, 60 is implemented according to a quarter-round hardware infrastructure according to aspects of this disclosure, thereby reducing the hardware requirements to maintain AES compliance and communication security between HMD SoC 2 and peripheral SoC 4.

Figure 3:
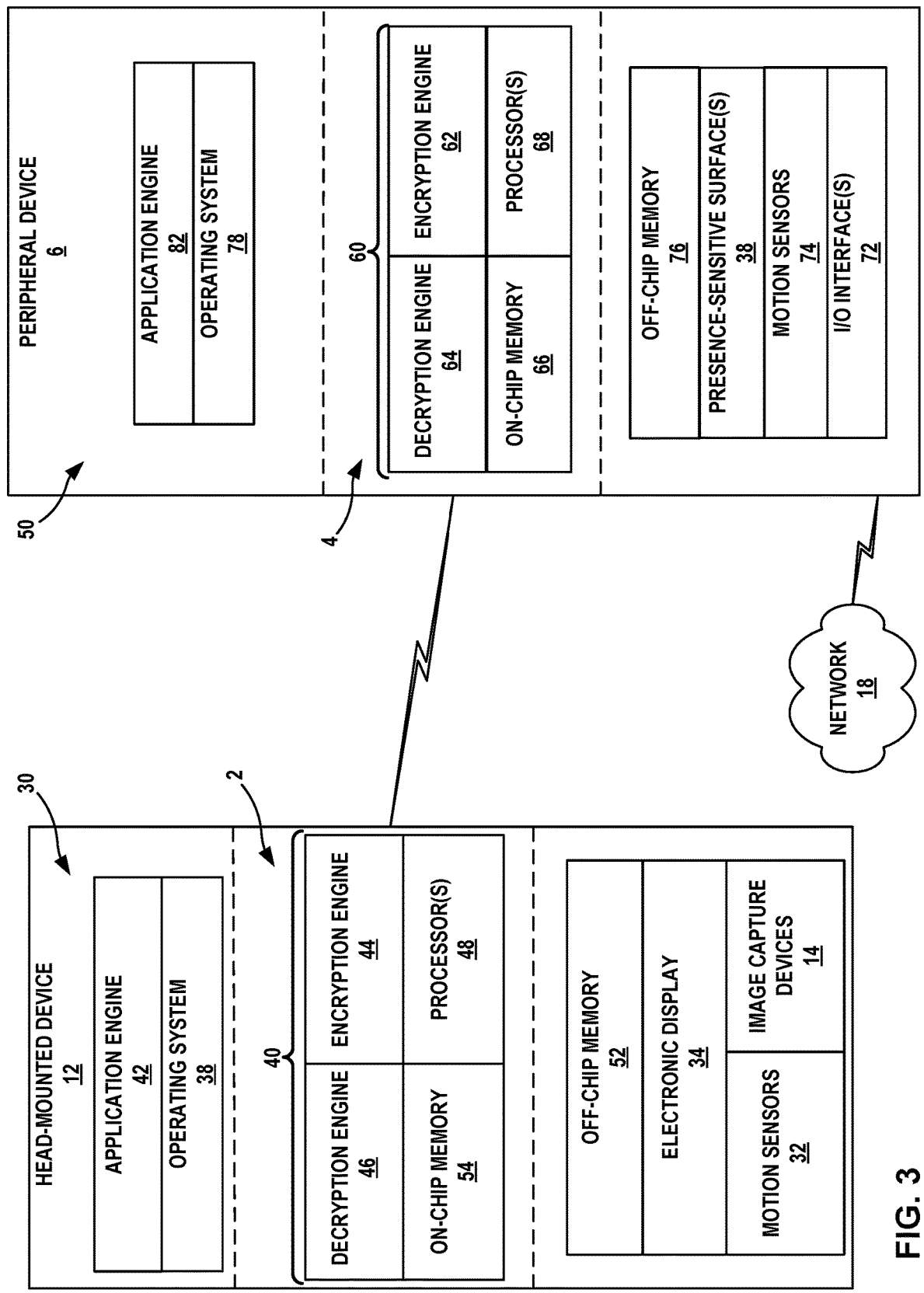
FIG. 3 is a block diagram showing example implementations of the HMD and the peripheral device of FIG. 1A.

FIG. 3 is a block diagram showing example implementations of HMD 12 and peripheral device 6. In this example, HMD SoC 2 of HMD 12 includes one or more processors 48 and memory 52, in addition to encryption engine 44 and decryption engine 46. Encryption engine 44 and decryption engine 46 are implemented separately in silicon, and collectively form AES engine 40 of HMD SoC 2. Off-chip memory 52 and processor(s) 48 of HMD 12 may, in some examples, provide a computer platform for executing an operating system 38. Operating system 38 may represent an embedded, real-time multitasking operating system, for instance, or other type of operating system. In turn, operating system 38 provides a multitasking operating environment for executing one or more software components 30, including application engine 42.

Processor(s) 48 may be coupled to one or more of electronic display 34, motion sensors 32, and/or image capture devices 14. Processor(s) 48 are included in HMD SoC 2, which also includes on-chip memory 54. On-chip memory 54 is collocated with processor(s) 48 within a single integrated circuit denoted as HMD SoC 2 in the particular example shown in FIG. 3. Processor(s) 48 may use on-chip memory 54 as a temporary storage location for self-contained data processing performed within HMD SoC 2. HMD 12 is communicatively coupled to peripheral device 6, as shown in FIG. 3. Peripheral device 6 and HMD 12 function in tandem as co-processing devices to deliver the artificial reality experiences to user 8 as described above with respect to FIGS. 1A-2. Peripheral device 6 may offload portions of the computing tasks otherwise performed by HMD 12, thereby enabling a reduced hardware infrastructure and therefore a lower-profile form factor with respect to the design of HMD 12.

Peripheral device 6 includes presence-sensitive surface(s) 38 (described above with respect to FIG. 2), as well as input/output (I/O) interface(s) 72, and motion sensors 74. Peripheral device 6 may invoke I/O interface(s) 72 to send and receive data over network 18, such as cipher text or plain text (unencrypted) data. I/O interface(s) 72 may also incorporate hardware that enables peripheral device 6 to communicate wirelessly with HMD 12. Peripheral device 6 may invoke motion sensors 74 to detect and track motion by user 8 for use in computing updated pose information for a corresponding frame of reference of HMD 12.

Peripheral SoC 4 of peripheral device 6 includes encryption engine 62, decryption engine 64, on-chip memory 66, and one or more processors 68. On-chip memory 66 represents memory collocated with processor(s) 68 within a single integrated circuit denoted as peripheral SoC 4 in the particular example shown in FIG. 3. Processor(s) 68 may use on-chip memory 66 as a temporary storage location for self-contained data processing performed within peripheral SoC 4. Collectively, encryption engine 62 and decryption engine 64 form AES engine 60. Off-chip memory 76 and processor(s) 68 of peripheral device 6 provide a computer platform for executing an operating system 78. Operating system 78 may represent an embedded, real-time multitasking operating system, for instance, or other type of operating system. In turn, operating system 78 provides a multitasking operating environment for executing one or more software components 50.

Apart from operating system 78, software components 50 include an application engine 82. In general, application engine 82, when invoked, provides functionality to provide and present an artificial reality application, e.g., a teleconference application, a gaming application, a navigation application, an educational application, a training application, a simulation application, or the like, to user 8 via HMD 12. Application engine 82 may include, for example, one or more software packages, software libraries, hardware drivers, and/or Application Program Interfaces (APIs) for implementing an artificial reality application.

While HMD 12 and peripheral device 6 may communicate on a number of levels, FIG. 3 is primarily described with respect to communications at the level represented by HMD SoC 2 and peripheral SoC 4. Again, HMD SoC 2 and peripheral SoC 4 implement cross-SoC communications in encrypted form, and tunnel the cross-SoC traffic by using a unique base key to encrypt/decrypt all crypto packet traffic on a single channel ID. For example, processor(s) 48 and processor(s) 68 are configured to select encryption keys to be applied by encryption engines 44 and 62 based on the channel ID of the crypto packet that will be formed using the data under encryption.

Upon receipt of a crypto packet, processor(s) 48 and processor(s) 68 may decapsulate the crypto packet, and as part of the decapsulation process, parse the channel ID information for the crypto packet. Based on the channel ID obtained from the parsed header, processor(s) 48 and processor(s) 68 may select the corresponding decryption keys to be applied by decryption engines 46 and decryption engine 64 to decrypt the decapsulated, encrypted payload. AES engines 40 and 60 thereby perform multi-key encryption and decryption with respect to transports communicated between HMD SoC 2 and peripheral SoC 4 to support SoC-to-SoC tunneling of crypto packets.

Encryption engines 44, 62 are configured according to aspects of this disclosure to improve encryption throughput by dedicating a greater number of cycles to round logic that mingles an encryption key with input data, by reducing the number of cycles required for key expansion operations. According to aspects of this disclosure, encryption engines 44, 62 leverage the high volume of contiguous data sent on the same channel ID, which can sometimes run into the order of hundreds of megabytes or potentially gigabytes, before a break in channel ID continuity. More specifically, encryption engines 44, 62 are configured according to aspects of this disclosure to bypass redundant key expansion operations for portions of egress traffic being encrypted, while maintaining encryption precision via AES compliance. Key expansion refers to an AES-defined operation set dedicated to deriving different variations of a base key to be added to plain-text input data in individual iterations during the round key addition computational stage of AES encryption. In the case of encrypting 128-bit data segments, the AES sets forth a ten-round key expansion operation set, resulting in ten derived encryption keys in addition to the original base key.

Encryption engines 44, 62 are configured according to aspects of this disclosure to operate according to control logic that determines whether the encryption key to be applied to a block of input data is the same as the encryption key that was used for the previously encrypted block of input data. More specifically, processor(s) 48, 68 implement security processing control logic that determines whether the channel ID for the input block to be encrypted matches with or differs from the channel ID of the input block that was encrypted immediately prior. If processor(s) 48, 68 determine that the channel IDs match for the input block to be encrypted and the block that was encrypted immediately prior, then encryption engines 44, 62 determine that the base key to be used to encrypt the input block is the same as the base key that was used to encrypt the block that was received immediately prior.

Based on the base key being the same for the previously encrypted block and the next block to be encrypted, encryption engines 44, 62 bypass the key expansion operations in encrypting the newly received block. Instead, encryption engines 44, 62 reuse the base key and the modified keys thereof that were used to encrypt the block immediately prior. Encryption engines 44, 62 leverage base key unity across a single channel ID to reuse the base key and the AES-compliant modified keys derived via key expansion for the first encrypted block of an ongoing and uninterrupted series of blocks belonging to a single channel ID, whether key expansion was performed for the immediately preceding block or for a block that was encrypted earlier in the uninterrupted series.

Because AES-compliant key expansion yields the same ten derived keys when performed using the same base key, encryption engines 44, 62 implement the techniques of this disclosure to bypass key expansion operations for any non-initial block of an uninterrupted series of blocks on the same channel ID. Encryption engines 44, 62 reduce resource usage by 20% to encrypt blocks that are not the first block in a contiguous sequence for a single channel ID, by opportunistically skipping key expansion operations for these non-initial blocks according to the techniques of this disclosure. When implemented with respect to contiguous transports with the same channel ID that are in the order of tens of megabytes, hundreds of megabytes, or even gigabytes, the power saving yielded by the 20% operational reduction of this disclosure is particularly significant.

Decryption engines 46, 64 are configured according to aspects of this disclosure to operate according to control logic that determines whether the decryption key to be applied to a block of encrypted input data is the same as the decryption key that was used for the previously decrypted block of encrypted input data. More specifically, processor(s) 48, 68 implement security processing control logic that determines whether the channel ID for the encrypted input block to be decrypted matches with or differs from the channel ID of the encrypted input block that was decrypted immediately prior. If processor(s) 48, 68 determine that the channel IDs match for the encrypted input block to be decrypted and the encrypted input block that was decrypted immediately prior, then decryption engines 46, 64 determine that the base key to be used to decrypt the encrypted input block is the same as the base key that was used to decrypt the encrypted input block that was received immediately prior.

Based on the base key being the same for the previously decrypted block and the next encrypted block to be decrypted, decryption engines 46, 64 bypass the key expansion operations in decrypting the newly received encrypted input block. Instead, decryption engines 46, 64 reuse the base key and the modified keys thereof that were used to decrypt the block immediately prior. Decryption engines 46, 64 leverage base key unity across a single channel ID to reuse the base key and the AES-compliant modified keys derived via key expansion for the first decrypted block of an ongoing and uninterrupted series of encrypted blocks received on a single channel ID, whether key expansion was performed for the immediately preceding encrypted block or for an encrypted block that was decrypted earlier in the uninterrupted series.

Because AES-compliant key expansion yields the same ten derived keys when performed using the same base key, decryption engines 46, 64 implement the techniques of this disclosure to bypass key expansion operations for any non-initial encrypted block of an uninterrupted series of encrypted blocks received on the same channel ID. Decryption engines 46, 64 reduce resource usage by 20% to decrypt encrypted blocks that are not the first block in a contiguous sequence received on a single channel ID, by opportunistically skipping key expansion operations for these non-initial blocks according to the techniques of this disclosure. When implemented with respect to contiguous transports received on the same channel ID that are in the order of tens of megabytes, hundreds of megabytes, or even gigabytes, the power saving yielded by the 20% operational reduction of this disclosure is particularly significant.

According to aspects of this disclosure, each of encryption engines 44, 62 and decryption engines 46, 64 is implemented in a lightweight manner. The throughput improvements of this disclosure enable each of encryption engines 44, 62 and decryption engines 46, 64 to maintain AES compliance even when implemented according to reduced hardware infrastructures. For example, each of encryption engines 44, 62 and decryption engines 46, 64 may be implemented in silicon using a quarter round hardware design. In these examples, each of encryption engines 44, 62 and decryption engines 46, 64 is implemented using 25% of the hardware required for an encryption engine or decryption engine (as the case may be) under the AES.

By leveraging the 20% operational reduction for encrypting/decrypting non-initial blocks of a contiguous crypto packet stream on a single channel ID, each of encryption engines 44, 62 and decryption engines 46, 64 maintains throughput and AES-compliant data precision, while reducing the hardware requirements to implement HMD SoC 2 and peripheral SoC 4. In this way, the throughput improvements of this disclosure also enable lower-profile and lower-cost designs of hardware, such as HMD 12 and peripheral device 6, in comparison to other similar devices that incorporate separate AES encryption and decryption hardware.

Each of processors 48, 68 may comprise any one or more of a multi-core processor, a controller, a digital signal processor (DSP), an application specific integrated circuit (ASIC), a field-programmable gate array (FPGA), processing circuitry (e.g., fixed-function circuitry or programmable circuitry or any combination thereof) or equivalent discrete or integrated logic circuitry. Any one or more of off-chip memory 52, off-chip memory 76, on-chip memory 54, or on-chip memory 66 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), or flash memory.

Figure 4:
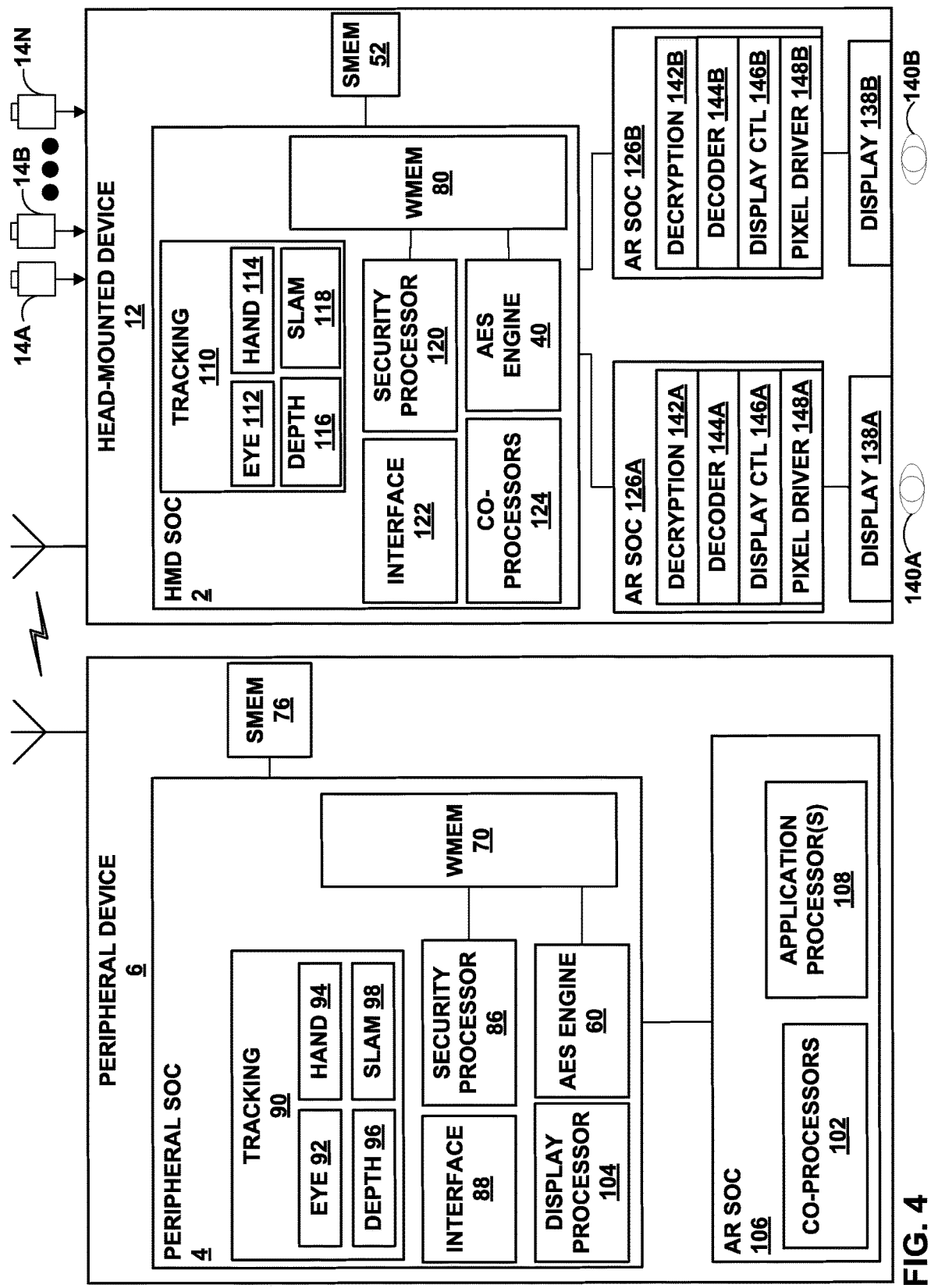
FIG. 4 is a block diagram illustrating a more detailed example implementation of a distributed architecture for the multi-device artificial reality systems of FIGS. 1A & 1B in which one or more devices are implemented using one or more system on a chip (SoC) integrated circuits within each device.

FIG. 4 is a block diagram illustrating a more detailed example implementation of a distributed architecture for a portion of multi-device artificial reality systems 10 and 20, in which two or more devices are implemented using respective SoC integrated circuits within each device. FIG. 4 illustrates an example in which HMD 12 operating in conjunction with peripheral device 6. Again, peripheral device 6 represents a physical, real-world device having a surface on which multi-device artificial reality systems 10 or 20 overlay virtual content. Peripheral device 6 includes one or more presence-sensitive surface(s) 38 for detecting user inputs by detecting a presence of one or more objects (e.g., fingers, stylus, etc.) touching or hovering over locations of presence-sensitive surfaces) 38.

In some examples, peripheral device 6 may have a form factor similar to any of a smartphone, a tablet computer, a personal digital assistant (PDA), or other hand-held device. In other examples, peripheral device 6 may have the form factor of a smartwatch, a so-called "smart ring," or other wearable device. Peripheral device 6 may also be part of a kiosk or other stationary or mobile system. Presence-sensitive surface(s) 38 may incorporate output components, such as display device(s) for outputting visual content to a screen. As described above, HMD 12 is architected and configured to enable the execution of artificial reality applications.

Each of HMD SoC 2, peripheral SoC 4, and the other SoCs illustrated in FIG. 4 represent specialized integrated circuits arranged in a distributed architecture, where each SoC integrated circuit includes various specialized functional blocks configured to provide an operating environment for artificial reality applications. FIG. 4 is merely one example arrangement of SoC integrated circuits that peripheral device 6 and HMD 12. The distributed architecture for multi-device artificial reality systems 10 and 20 may include any collection and/or arrangement of SoC integrated circuits.

In the example of FIG. 4, HMD SoC 2 of HMD 12 comprises functional blocks including tracking 110, security processor 120, interface 122, co-processors 124, and AES engine 40. AES engine 40 include encryption engine 44 and decryption engine 46 implemented separately in silicon. Tracking 110 provides a functional block for eye tracking 112 ("eye 112"), hand tracking 114 ("hand 114"), depth tracking 116 ("depth 116"), and/or Simultaneous Localization and Mapping (SLAM) 118 ("SLAM 118").

For example, HMD 12 may receive input from one or more accelerometers (e.g., quantities represented in inertial measurement units or "IMUS") that output data indicative of current acceleration of HMD 12, GPS sensors that output data indicative of a location of HMD 12, radar or sonar that output data indicative of distances of HMD 12 from various objects, or other sensors that provide indications of a location or orientation of HMD 12 or other objects within a physical environment. HMD 12 may also receive image data from one or more image capture devices 14A-14N (collectively, "image capture devices 14").

Image capture devices 14 may include various inward-facing and/or outward-facing image capture hardware, including one or more of still cameras, video cameras, laser scanners, Doppler® radar scanners, fundal photography hardware, infrared imaging hardware depth scanners, or the like, configured to output image data representative of the physical environment. Image capture devices 14 capture image data representative of objects (including peripheral device 6 and/or hand and/or the eyes of user 8) in the physical environment that are within a field of view of image capture devices, which typically corresponds with the viewing perspective of HMD 12 or the inward-facing view of HMD 12. Based on a portion of the sensed data and/or a portion of the image data, tracking 110 determines, for example, a current pose for the frame of reference of HMD 12 and, in accordance with the current pose, renders the artificial reality content. AES engine 40 is a functional block configured to encrypt Tx channel data communicated to peripheral device 6 and to decrypt Rx channel data communicated from peripheral device 6 or other system.

Application co-processors 124 include various processors such as a video processing unit, graphics processing unit (GPU), digital signal processors (DSPs), encoders and/or decoders, and/or others. In accordance with the techniques described in this disclosure, all or portions of a backend shell may be in hardware, software, or a combination of hardware and software. For example, the backend shell of a concurrent application engine may be executed on co-application processors 124. A plurality of artificial reality applications may be concurrently executed on co-application processors 124, in some examples.

AR SoCs 126A and 126B each represent display controllers for outputting artificial reality content on respective displays, e.g., displays 138A, 138B (collectively, "displays 138"). In this example, AR SoC 126A may include a display controller for display 138A to output artificial reality content for a left eye 140A of user 8. In the example of FIG. 4, AR SoC 126A includes a decryption block 142A, a decoder block 144A, a display controller 146A, and a pixel driver 148A for outputting artificial reality content on display 138A. Similarly, AR SoC 126B includes a display controller for display 138B to output artificial reality content for a right eye 140B of user 8. In the example of FIG. 4, AR SoC 126B includes a decryption unit 142B, a decoder 144B, a display controller 146B, and/or a pixel driver 148B for generating and outputting artificial reality content on display 138B. Displays 138 may include any one or more of light-emitting diode (LED) displays, organic LEDs (OLEDs), quantum dot LEDs (QLEDs), electronic paper (E-ink) displays, liquid crystal displays (LCDs), or other types of displays for displaying digital content, such as artificial reality content 22.

Peripheral device 6 includes peripheral SoC 4 and AR SOC 106 configured to support an artificial reality application. In this example, peripheral SoC 4 comprises functional blocks including AES engine 40, interface 88, tracking 90, security processor 86, and display processor 104. Tracking 90 is a functional block providing eye tracking 92 ("eye 92"), hand tracking 94 ("hand 94"), depth tracking 96 ("depth 96"), and/or simultaneous localization and mapping (SLAM) 98 ("SLAM 98").

For example, peripheral device 6 may receive input from one or more accelerometers (quantified in IMUs) that output data indicative of current acceleration of peripheral device 6, GPS sensors that output data indicative of a location of peripheral device 6, radar or sonar that output data indicative of distances of peripheral device 6 from various objects, or other sensors that provide indications of a location or orientation of peripheral device 6 or other objects within a physical environment. Peripheral device 6 may in some examples also receive image data from one or more image capture devices, such as still cameras, video cameras, laser scanners, Doppler® radar scanners, depth scanners, or the like, configured to output image data representative of the physical environment. Based on the sensed data and/or image data, tracking block 90 determines, for example, a current pose for the frame of reference of peripheral device 6 and, in accordance with the current pose, renders the artificial reality content to HMD 12.

AES engine 60 includes encryption engine 62 and decryption engine 64, implemented separately in silicon. As such, AES engine 60 is a functional block configured to encrypt Tx channel data communicated to HMD 12 and to decrypt Rx channel data communicated from HMD 12. In various examples, AES engine 60 may support symmetric key cryptography to encrypt/decrypt data using a session key (e.g., a secret symmetric key). Display processor 104 includes one or more processors such as a video processing unit, graphics processing unit, encoders and/or decoders, and/or others, for rendering artificial reality content to HMD 12.

Interface 88 includes one or more interfaces for connecting to functional blocks of HMD SoC 4. As one example, interface 88 may include peripheral component interconnect express (PCIe) slots. HMD SoC 4 may connect with AR SoC 106 using interface 88. HMD SoC 4 may connect with one or more communication devices (e.g., radio transmitter) using interface 88 for communicating with other devices, such as HMD 12. Security processor 86 provides secure device attestation and mutual authentication of when pairing peripheral device 6 with devices, e.g., HMD 12, used in conjunction within the AR environment. Security processor 86 may authenticate AR SoC 106 of peripheral device 6.

AR SoC 106 includes application co-processors 102 and application processors 108. In this example, co-application processors 102 includes various processors, such as a vision processing unit (VPU), a graphics processing unit (GPU), and/or central processing unit (CPU). Application processors 108 may include a processing unit for executing one or more artificial reality applications to generate and render, for example, a virtual user interface to a surface of peripheral device 6 and/or to detect gestures performed by a user with respect to peripheral device 6.

Peripheral SoC 4 includes wireless memory (WMEM) 70, which represents a portion of or the entirety of on-chip memory 66. HMD SoC 2 includes WMEM 80, which represents a portion of or the entirety of on-chip memory 54. Each of peripheral SoC 4 and HMD SoC 2 may support multiple subsystems of peripheral device 6 and HMD 12, respectively. Peripheral SoC 4 may load data (for any subsystem) to WMEM 70 on a temporary basis, to enable further on-chip processing of the data by AES engine 60 or other components of peripheral SoC 4. Similarly, HMD SoC 2 may load data (for any subsystem) to WMEM 80 on a temporary basis, to enable further on-chip processing of the data by AES engine 40 or other components of HMD SoC 2.

To improve encryption and decryption throughput, AES engines 40 and 60 implement the techniques of this disclosure to opportunistically bypass key expansion for portions of the cross-SoC crypto packet traffic between HMD SoC 2 and peripheral SoC 4. Security processors 86, 120 are configured to map base keys to channel IDs on a one-to-one basis. AES engines 40 and 60 leverage the base key homogeneity within contiguous traffic on a single channel ID to eliminate key expansion operations that will yield the same result as the last key expansion operation set that was performed. In accordance with aspects of this disclosure, AES engines 40 and 60 bypass key expansion if the channel ID for the input block undergoing encryption/decryption matches the channel ID of the block that was encrypted/decrypted immediately before.

Each of AES engines 40 and 60 makes the determination of whether to bypass key expansion discretely within the encryption pipeline and discretely within the decryption pipeline. Using the opportunistic key expansion skipping techniques of this disclosure, AES engines 40 and 60 limit key expansion operations only to the initial block encrypted/decrypted for a particular channel ID in a given pipeline, and reuse the key expansion results for all consecutive blocks encrypted/decrypted for that particular channel ID in the pipeline.

Additionally, each of AES engines 40 and 60 is implemented in a lightweight manner, in accordance with aspects of this disclosure. The throughput improvements of this disclosure enable each of AES engines 40 and 60 to maintain AES encryption and decryption compliance even when implemented according to reduced hardware infrastructures. For example, each of AES engines 40 and 60 may include individual encryption and decryption engines implemented separately in silicon using a quarter round hardware design. In these examples, each of AES engines 40 and 60 is implemented using 25% of the hardware required for a separate encryption engine and decryption engine under the AES.

By leveraging the 20% operational reduction for encrypting/decrypting non-initial blocks of a contiguous crypto packet stream on a single channel ID, each of AES engines 40 and 60 maintains throughput and AES-compliant data precision with respect to both encryption and decryption, while reducing the hardware requirements to implement HMD SoC 2 and peripheral SoC 4. In this way, the throughput improvements of this disclosure also enable lower-profile and lower-cost designs of hardware, such as HMD 12 and peripheral device 6, as compared to other similar devices that incorporate separate AES encryption and decryption hardware.

Figure 5:
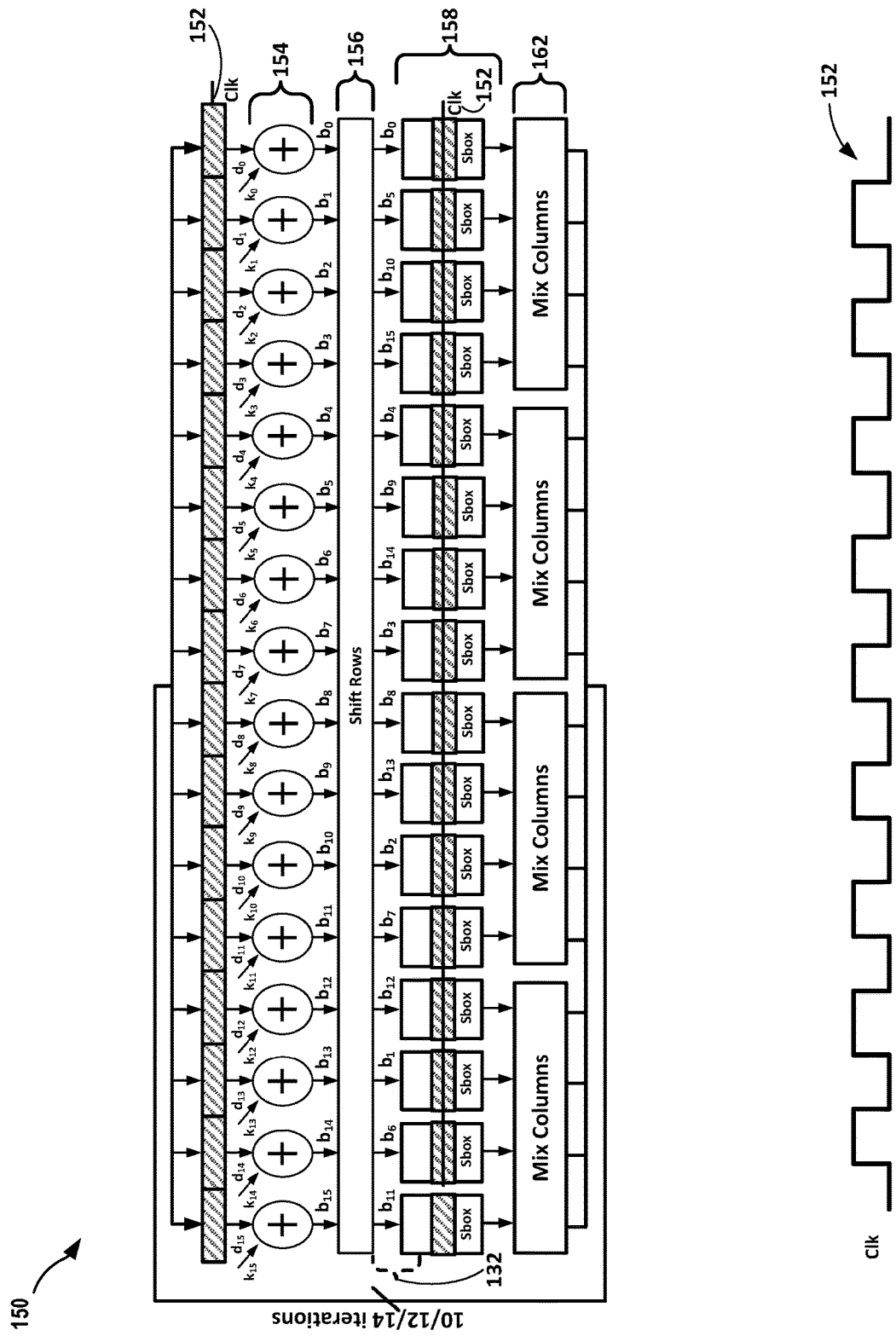
FIG. 5 is a conceptual diagram illustrating an example of AES-compliant encryption or decryption datapath.

FIG. 5 is a conceptual diagram illustrating an example of an AES-compliant encryption or decryption datapath. The process and structure illustrated in FIG. 5 is referred to herein as AES round datapath 150. An AES-compliant decryption engine may implement AES round datapath 150 to decrypt an input block of cipher text, by performing inverse operations with respect to a reciprocal encryption datapath that generates cipher text from unencrypted input data. Various aspects of AES round datapath 150 operate according to master clock 152. The clock rate of master clock 152 is described as running at a "full frequency" in the implementation illustrated in FIG. 5 to provide maximum decryption throughput with respect to decryption datapath 150. In other examples, master clock 152 may run at other frequencies.

Add round key step 154 represents an iterative process in which the input bytes are mingled with round (decryption) key data ten times, with each iteration using a different round key obtained during key expansion step 132, in the case of 128-bit key usage. AES requires a separate 128-bit round key block for each round of add round key step, namely, the base key, and nine intermediate keys derived from the base key. An add round key step in an AES-compliant encryption datapath generally corresponds to add round key step 154, but uses ten (10) encryption keys as the round keys, and mixes the round keys with plain text input instead of the encrypted input block in the case of add round key step 154. Each input byte-key pair is shown in FIG. 5 using a "d-k" notation, using subscripts to delineate the different input bytes and the different decryption keys.

The sixteen output bytes (denoted using a "b" notation with unique subscripts) of add round key step 154 are then shifted cyclically by various offsets in a shift rows step 156. The shift rows step 156 cyclically shifts the bytes in each row by a certain offset determined for that particular row. In the shift rows step 156, the first row is left unchanged, each byte of the second row is right-shifted by an offset of one, each byte of the third row is right-shifted by an offset of two, and each byte of the fourth row is right-shifted by an offset of three. Thus, each column of the output data from shift rows step 156 includes shifted data from a column of the input data. The right-shifting operations described with respect to shift rows step 156 are generally reciprocal to left-shifting operations that are performed by a reciprocal AES-compliant encryption datapath.

The structure of the data output by the shift rows step 156 does not permit for independently operating on separate segments of the original 16-byte input, because data produced from four different block ciphers may be included in each four-byte run of the data output by the shift rows step 156. The shift rows step 156 is an iterative process that is performed in multiple passes, which, in the particular example of FIG. 5, is a ten-iteration step.

Each respective output byte of the shift rows step 156 is then passed through a respective inverse substitute byte (inverse Sbox) unit as part of inverse byte substitution computational stage 158. Decryption datapath 150 implements inverse byte substitution computational stage 158 by inverting a lookup table (LUT)-based substitution as a deciphering operation performed on the encrypted input data. In the reciprocal byte substitution step of an encryption datapath, each byte in the array output by a shift rows step is replaced with a substitute byte obtained using a LUT, which is also sometimes referred to as an 8-bit substitution box. Inverse byte substitution computational stage 158 addresses non-linearity in the cipher code received as input for AES round datapath 150.

Portions of shift rows step 156 and inverse byte substitution computational stage 158 combine to perform key expansion, which is shown as key expansion step 132 in FIG. 5. That is, the same hardware of decryption engine 4 alternately decrypts data with a round key for the current round, and then derives the next round key for the subsequent round. The first iteration of key expansion step 132 uses a decryption key referred to herein as a "base key" as its input data, and each subsequent round uses the previous round's round key as its input data. Key expansion step 132 represents an iterative process that generates multiple variations of the base key accepted as input. The variations of the base key generated during key expansion step 132 are collectively referred to as "round keys." In compliance with the AES, key expansion step 132 derives the round keys from the base key using Rijndael's key schedule. In instances of the base key being 128 bits in length, key expansion step 132 produces ten (10) round keys, including the base key itself and nine (9) intermediate keys derived from the base key, in compliance with the AES. A corresponding key expansion step in an AES-compliant encryption datapath generally corresponds to key expansion step 132, but accepts an encryption key as the base key input instead of the decryption key in the case of key expansion step 132.

According to AES round datapath 150, a 16-byte (128-bit) encrypted input is provided, on a per-byte basis, to sixteen adder units as part of add round key" step 154. In add round key step 154, each byte of the data input is added to the round key (the base key or the intermediate key obtained from the base key, as the case may be for the current round that were derived in key expansion step 132) obtained using Rijndael's key schedule. In the case of a 128-bit key, for which key expansion step 132 produces ten (10) round keys (namely, the base key itself and nine (9) intermediate keys derived in subsequent iterations), add round key step 154 mingles the encrypted input block with each of the ten (10) round keys.

The byte-substituted outputs of the sixteen inverse Sbox units are then provided to an array of mix columns units for performance of mix columns step 162. AES round datapath 150 includes four mix columns units, each of which receives, as input, the outputs of four contiguous inverse Sbox units. As such, each mix columns unit processes a four-byte input as part of mix columns step 162. In mix columns step 162, each mix columns unit combines the respective four-byte input using an invertible linear transformation. Each mix columns unit receives a four-byte input, and produces a four-byte output. Each four-byte input received by a respective mix columns unit is sometimes referred to as a respective "column" in the context of during mix columns step 162. Each mix columns unit of AES round datapath 150 processes the respective input column using matrix multiplication such that every single input byte affects all four output bytes. In a reciprocal encryption process, the combination of the reciprocal shift rows step and mix columns step provides diffusion in the cipher operation set.

An encryption datapath corresponding to decryption datapath 150 accepts a 16-byte (128-bit) block of unencrypted data, and performs key expansion on an encryption key as the base key using Rijndael's key schedule to obtain the round keys. The corresponding encryption datapath) from to the unencrypted input, on a byte-by-byte basis during the corresponding "add round key" step. In a corresponding Sbox stage, the encryption datapath employs Sbox units, instead of inverse Sbox units described with respect to the decryption operations of AES round datapath 150. Purely for the sake of brevity, a separate AES encryption datapath is not illustrated in the accompanying drawings, in light of the structural parallels between the AES-compliant encryption datapath and the decryption-based AES round datapath 150 of FIG. 5. AES round datapath 150 represents a "full round" datapath, which is performed by a full round hardware infrastructure.

Figure 6:
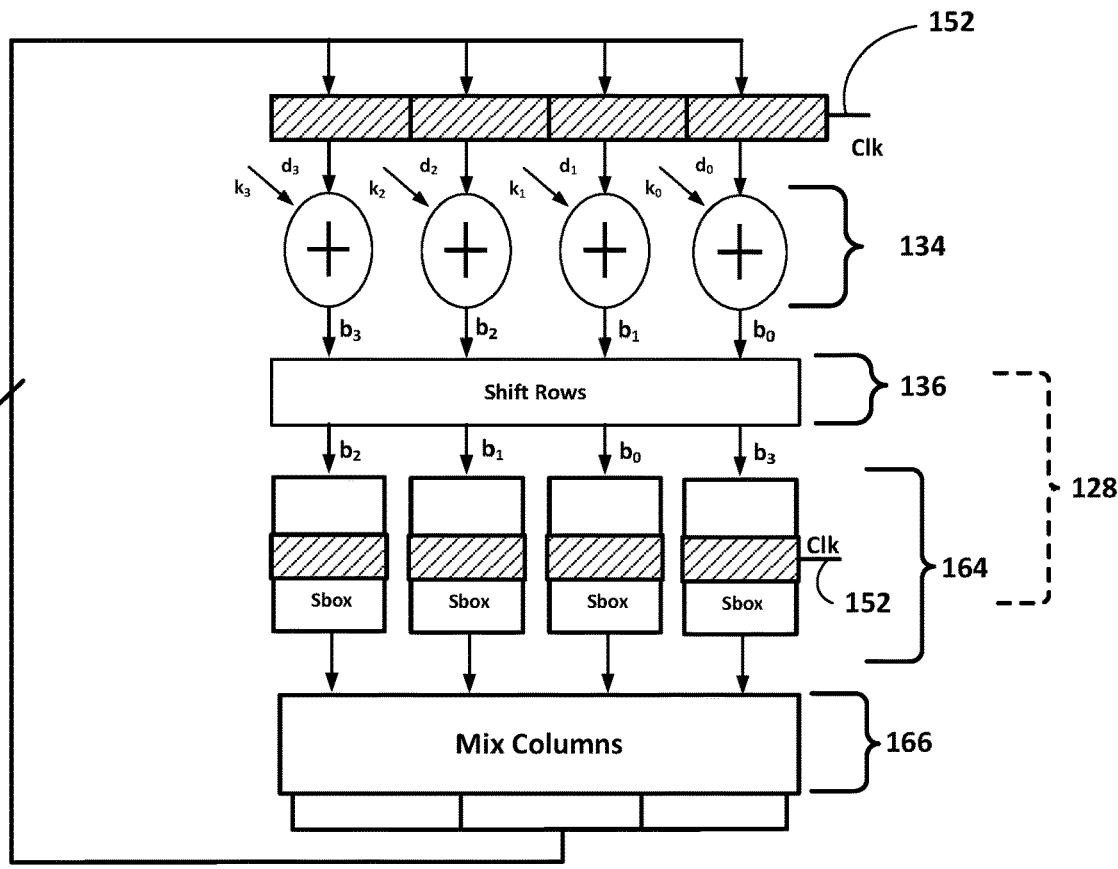
FIG. 6 is a conceptual diagram illustrating an example of a reduced encryption or decryption datapath that the AES engines of FIG. 4 may implement, in accordance with aspects of this disclosure.

FIG. 6 is a is a conceptual diagram illustrating an example of a reduced encryption or decryption datapath that AES engines 40, 60 may implement, in accordance with aspects of this disclosure. Quarter round decryption datapath 160 of FIG. 6 represents an example of a reduced datapath that decryption engines 46, 64 may implement using the quarter round hardware infrastructures of this disclosure. Encryption engines 44, 62, which are also designed with quarter round hardware according to aspects of this disclosure, may implement quarter round encryption datapaths that are structurally parallel to quarter round decryption datapath 160 of FIG. 6.

The stages of quarter round decryption datapath 160 is computationally parallel to those of AES round datapath 150 of FIG. 5. In comparison, quarter round decryption datapath 160 processes a quarter of the data that AES round datapath 150 processes in a single iteration. Decryption engines 46, 64 leverage the throughput improvements of this disclosure to serialize the decryption of 32-bit segments of an AES-compliant 128-bit input using quarter round decryption datapath 160. For instance, while opportunistically skipping operations that are identified as redundant using the techniques of this disclosure.

The computational stages illustrated in FIG. 6 with respect to quarter round decryption datapath 160 are, add round key step 134, shift rows step 136, inverse by substitution stage 164, and mix columns step 166. Various aspects of quarter round decryption datapath 160 operate according to master clock 152 of FIG. 5, which may be set to run at full frequency or at other frequencies in different use cases. The computational stages shown with respect to quarter round decryption datapath 160 are computationally parallel to the corresponding computational stages of AES round datapath 150. However, as shown by the reduced width of these computational stages of quarter round decryption datapath 160 in comparison to the corresponding computational stages of AES round datapath 150, each computational stage of quarter round decryption datapath 160 processes a quarter of the data in one iteration in comparison to AES round datapath 150.

Portions of shift rows step 136 and inverse byte substitution computational stage 164 combine to perform key expansion, which is shown as key expansion step 128 in FIG. 6. Decryption engines 46, 64 implement techniques of this disclosure to identify instances in which the performance of key expansion step 128 is redundant with respect to a previously decrypted 128-bit block. More specifically, decryption engines 46, 64 leverage the in-channel base key uniformity used by AES engines 40, 60 to detect round key redundancy with respect to consecutive cipher text blocks that belong to the same channel ID. If decryption engines 46, 64 determine that a 32-bit cipher text input belongs to a 128-bit cipher text block that was received under the same channel ID as the 128-bit cipher text block that was received immediately before it. In this scenario, because AES-compliant key expansion yields the same ten round keys (i.e., the common base key assigned to the channel ID, and the nine (9) intermediate keys derived from the common base key), decryption engines 46, 64 reuse the round keys that were used for the previous block of cipher text that was decrypted.

Decryption engines 46, 64 may reuse the same round keys that were used for the block decrypted immediately before, agnostically to whether those round keys were themselves reused in the case of the immediately preceding block, or were derived newly for the immediately preceding block. That is, decryption engines 46, 64 may bypass key expansion step 128 if a cipher text block being decrypted currently is a non-initial block in a consecutive series of cipher text blocks received under the same channel ID. When performed, key expansion step 128 consumes ten rounds of computational operations, out of fifty total rounds of computational operations normally required for the combination of key expansion step 128 and add round key step 134.

Thus, in instances in which decryption engines 46, 64 bypass key expansion step 128 based on round key redundancy from an immediately preceding decryption operation, decryption engines 46, 64 reduce the computational overhead of the round key-related portions of quarter round decryption datapath 160 by 20%. In many use case scenarios, HMD SoC 2 and peripheral SoC 4 may receive long, uninterrupted streams of crypto packets under the same channel ID, sometimes in the order of hundreds of megabytes or potentially even in the order of gigabytes. In these scenarios, decryption engines 46, 64 opportunistically skip key expansion step 128 according to aspects of this disclosure to reduce decryption-related resource usage over particularly significant amounts of data by 20%, thereby improving throughput and availing of lightweight hardware infrastructure while maintaining AES-compliant raw data output.

Because of the throughput improvements provided by bypassing key expansion step 128 in these instances, the quarter round hardware of decryption engines 46, 64 can serialize 32-bit segments of each 128-bit cipher text input to fully decrypt the 128-bit cipher text input, while mitigating time delays that would otherwise be caused by such a serialized decryption of multiple segments of a single 128-bit cipher text input. In this way, the configurations of this disclosure provide several technical improvements, including reducing hardware infrastructure requirements, improving throughput, and maintaining data precision by way of AES compliance in terms of the raw data that is output by decryption engines 46, 64.

Encryption engines 44, 64 are also lightweight engines, and are implemented using the reduced quarter round hardware design of this disclosure. Additionally, encryption engines 44, 64 implement the opportunistic key expansion skipping techniques of this disclosure to yield throughput improvements (as described above) in cases of non-initial raw input blocks of a continuous sequence of input blocks to be transmitted on a single channel ID. Because of the reduced hardware designs of this disclosure, encryption engines 44, 64 encrypt data using a quarter round encryption datapath that is structurally parallel to quarter round decryption datapath 160. Purely for the sake of brevity, a separate quarter round encryption datapath is not illustrated in the accompanying drawings, in light of the structural parallels between the quarter round encryption datapath implemented by encryption engines 44, 64 and quarter round decryption datapath 160 of FIG. 6.

Figure 7:
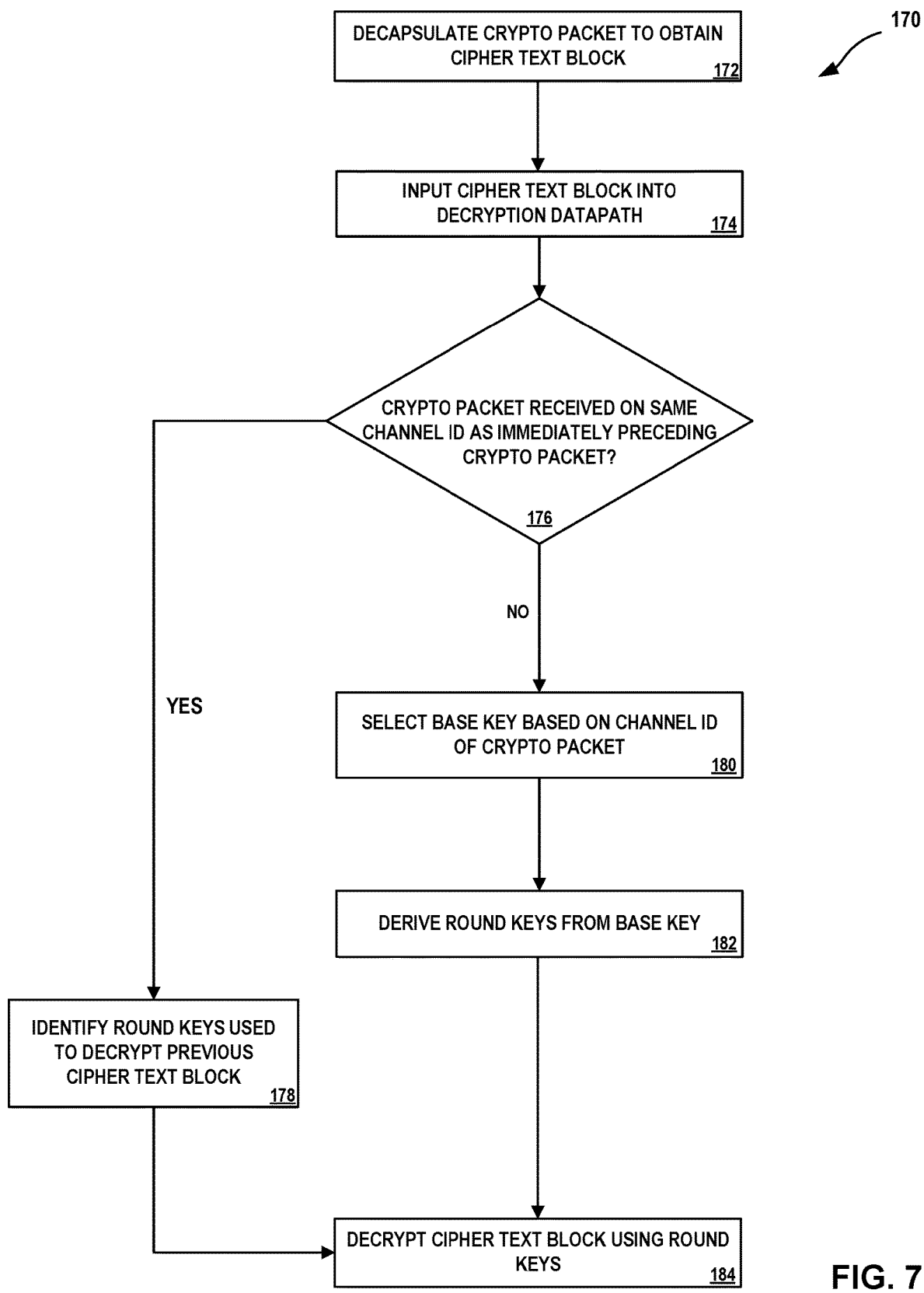
FIG. 7 is a flowchart illustrating an example process that SoCs illustrated in FIGS. 1A-4 may perform, in accordance with aspects of this disclosure.

FIG. 7 is a flowchart illustrating a process 170 that HMD SoC 2 or peripheral SoC 4 may perform, in accordance with aspects of this disclosure. Purely for ease of discussion, process 170 is described herein as being performed by components of peripheral SoC 4, although it will be appreciated that corresponding components of HMD SoC 2 are also configured to perform the relevant steps of process 170. Before process 170 begins, processor(s) 68 may receive an incoming crypto packet via I/O interface(s) 72. That is, I/O interface(s) serve as an ingress interface in this example.

Process 170 may begin when a security processor of processor(s) 68 decapsulates the crypto packet to obtain a cipher text block (172). That is, the security processor of processor(s) 68 may remove an encryption header of the crypto packet to expose an encrypted payload that includes one or more cipher text blocks, including the cipher text block referenced in step 172 of process 170.

The security processor of processor(s) 68 may input the obtained cipher text block into quarter round decryption datapath 160 (174). Decryption engine 64 may implement quarter round decryption datapath 160 iteratively with respect to multiple cipher text blocks. As such, any data that is fed into or is presently undergoing decryption along quarter round decryption datapath 160 is described as being processed by a current instance of quarter round decryption datapath 160, while any previously decrypted data is described as having been output by a previous instance of quarter round decryption datapath 160 performed by decryption engine 64.

Decryption engine 64 may determine whether the crypto packet carrying the cipher text block was received on the same channel ID as the immediately preceding crypto packet (decision block 176). For example, the immediately preceding crypto packet may represent a crypto packet that processor(s) 68 received over the ingress interface of I/O interface(s) 72 immediately prior to the most recently received and decapsulated crypto packet. The channel IDs of the most recently received and decapsulated crypto packet represent respective {source, destination} tuples for the corresponding packets at subsystem-level granularity. The security processor of processor(s) 68 may obtain the channel ID for each crypto packet by parsing the encryption header that was obtained via decapsulation of the respective crypto packet.

If decryption engine 64 determines that the crypto packet that carried the cipher text block was received on the same channel ID as the immediately preceding crypto packet (YES branch of decision block 176), decryption engine 64 may identify the set of round keys used to decrypt the previous cipher text block obtained from the immediately preceding crypto packet (178). For instance, decryption engine 64 may obtain the set of round keys applied to perform add round key computational stage 134 in the previous instance of quarter round decryption datapath 160, to decrypt the preceding cipher text block obtained from decapsulation of the preceding crypto packet. In some examples, decryption engine 64 may reuse the round keys presently stored to on-chip memory 66. In some examples, decryption engine 64 may, for a given iteration of decryption, access the corresponding round key stored to one or more pipeline registers of peripheral SoC 4, and reuse the round key accessed from the pipeline register.

In turn, decryption engine 64 may decrypt the cipher text block using the set of round keys (184). That is, in this example (in which process 170 traverses the YES branch of decision block 176), decryption engine 64 may perform step 184 by reusing the set of round keys obtained from the previous instance of quarter round decryption datapath 160 to perform the corresponding add round key computational stage 134 of the current instance of quarter round decryption datapath 160 used to decrypt the current cipher text block. In this way, decryption engine 64 may opportunistically bypass key expansion step 128 based on channel ID continuity between consecutively received crypto packets.

If, however, decryption engine 64 determines that the crypto packet that carried the cipher text block was received on a different channel ID as compared to the channel ID of the immediately preceding crypto packet (NO branch of decision block 176), decryption engine 64 may select a base key based on the channel ID obtained from the encryption header of the most recently received and decapsulated crypto packet (180). In this instance, decryption engine may perform key expansion step 128 to derive round keys from the selected base key (182). In this scenario (in which process 170 traverses the NO branch of decision block 176), decryption engine 64 may, in turn, decrypt the cipher text block using a set of round keys that are newly derived from the base key via key expansion step 128.

Encryption engines 44, 62 may perform encryption processes that generally correspond to process 170, but using channel IDs that will be later inserted into an encryption header during encapsulation, instead of using channel IDs obtained via decapsulation and parsing of encryption headers as in the case of process 170. In this way, encryption engines 44, 62 may also implement the techniques of this disclosure to opportunistically skip the key expansion computational stage of AES encryption based on channel ID continuity between crypto packets that will be transmitted consecutively.

Figure 8:
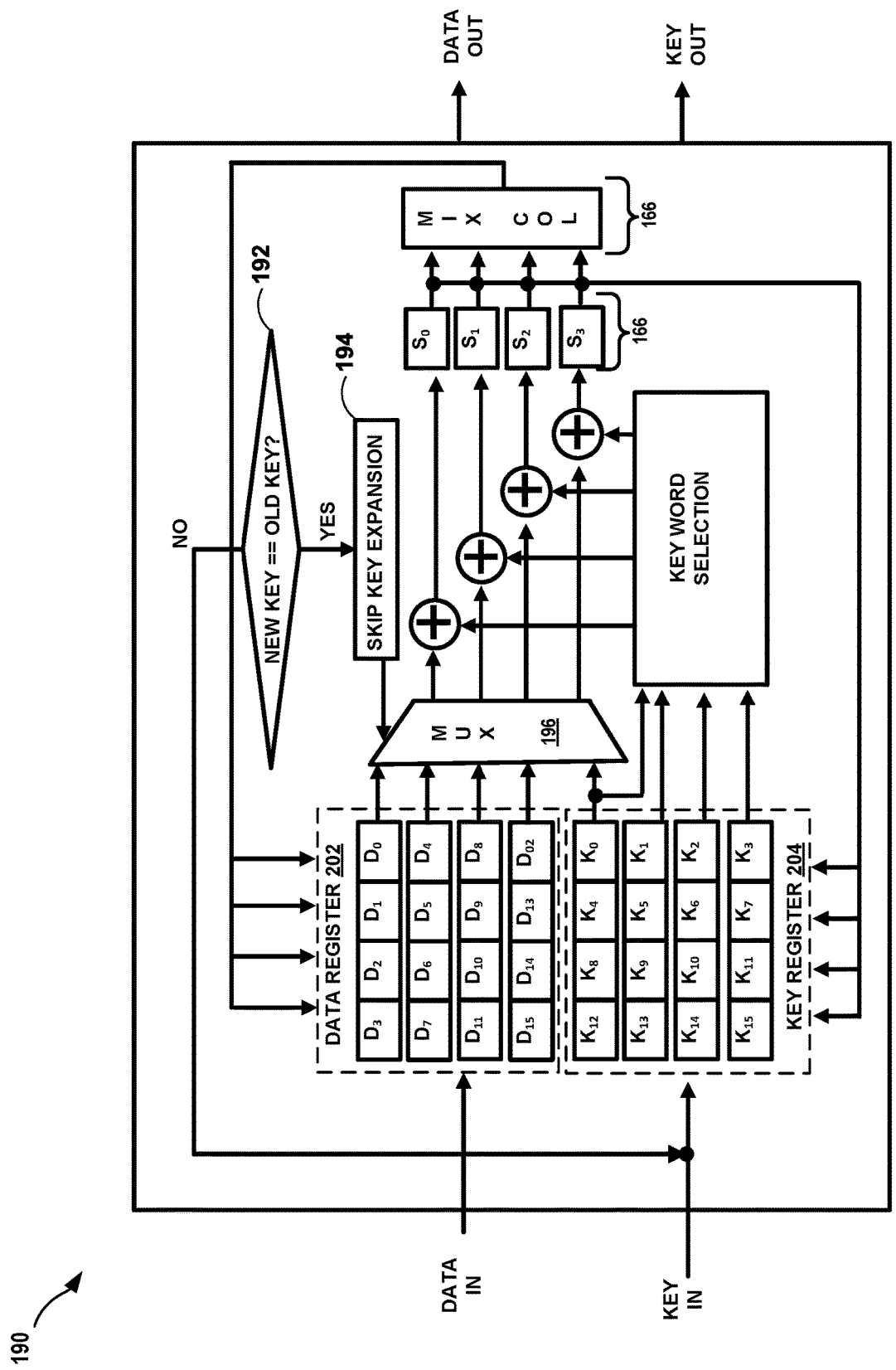
FIG. 8 is a conceptual diagram illustrating another example of a reduced encryption or decryption datapath that the AES engines of FIG. 4 may implement, in accordance with aspects of this disclosure.

FIG. 8 is a conceptual diagram illustrating another example of a reduced encryption or decryption datapath that AES engines 40, 60 may implement, in accordance with aspects of this disclosure. Quarter round decryption datapath 190 of FIG. 6 represents an example of a reduced datapath that decryption engines 46, 64 may implement using the quarter round hardware infrastructures of this disclosure. Encryption engines 44, 62, which are also designed with quarter round hardware according to aspects of this disclosure, may implement quarter round encryption datapaths that are structurally parallel to quarter round decryption datapath 160 of FIG. 6.

Quarter round decryption datapath 190 is similar to quarter round decryption datapath 160 of FIG. 6, and illustrates decision logic that decryption engines 46, 64 may execute in implementing the throughput-enhanced decryption techniques of this disclosure. As part of add round key step 134 shown in FIG. 6, decryption engines 46, 64 multiplex cipher text data segments (shown in data register 202) and decryption key segments (shown in key register 204) using multiplexer (MUX) 196. In accordance with aspects of this disclosure, decryption engines 46, 64 execute decision block 192 to determine whether the base key to be used for decrypting the next cipher text block is the same as the base key that was used for the cipher text block that was decrypted immediately prior.

If decryption engines 46, 64 determine that the new base key is the same as the old base key (YES branch of decision block 192), then decryption engines 46, 64 may skip key expansion for the new block of cipher text (194), and re-invoke MUX 196 to multiplex round key segments available from key register 204 with cipher text segments available from data register 202. Again, decryption engines 46, 64 (or control logic coupled thereto) may determine whether or not the new base key is the same as the previous base key based on channel ID continuity between the crypto packets that carried the previous cipher text block and the cipher text block being processed currently as their respective encrypted payloads. On the other hand, if decryption engines 46, 64 determine that the new base does not match the previous base key (NO branch of decision block 192), then decryption engines 46, 64 may perform key expansion with the new base key to obtain a new set of round keys to be applied during add round key step 134.

In each cycle of the serialized decryption of this disclosure, the key word selectin unit of FIG. 8 provides the appropriate word of the key for a given word of the data. Because decryption engines 46, 64 are lightweight decryption engines implemented using quarter round hardware, each round operation takes four (4) cycles to process the four (4) words of cipher text data in serialized format. In each cycle, the key selection unit provides the correct word of the key for that cycle, and is agnostic whether the selected key is newly generated or reused.

FIGS. 9A & 9B are conceptual diagrams illustrating the throughput improvements of this disclosure in a comparative manner. FIG. 9A illustrates operation sequence 200A, in which an AES engine (encryption or decryption) performs key expansion according to existing AES-defined operation. An AES engine performs operation sequence 200A preceding and during round key addition, using a new 128-bit base key to perform key expansion after every four cycles of round key addition to cipher text data. Key expansion cycles 198A and 198B of FIG. 9A form the last cycle of every five consecutive cycles in operation sequence 200A. As such, key expansion iterations 198A and 198B (as well as future key expansion cycles of operation sequence 200A) form 20% of the key-based cycles of the overall AES datapath in which operation sequence 200A. This is because key expansion cycles 198A, 198B, and future key expansion cycles consume one cycle out of every five cycles of operation sequence 200A.

FIG. 9B illustrates operation sequence 200B, in which an AES engines 40, 60 perform the selective key expansion skipping techniques of this disclosure to improve encryption/decryption throughput. In the example of operation sequence 200B, AES engines 40, 60 reuse the round keys used for the previous input block that was encrypted/decrypted, if the channel ID tuple for the input block currently being processed matches the channel ID tuple for the input block that was encrypted/decrypted immediately prior. In the example of operation sequence 200B, AES engines 40, 60 perform key expansion cycle 198A, but bypass key expansion cycle 198B at the juncture at which key expansion cycle 198B was performed in operation sequence 900A. The continuous round key addition for more than four consecutive cycles is shown in operation sequence 900B by way of key expansion skip 206.

In the example of operation sequence 900B, key expansion cycle 198A represents an operation that AES engines 40, 60 perform for the first input block in an uninterrupted series of input blocks associated with a single channel ID, and skip key expansion for non-first input blocks of the uninterrupted series of input blocks associated with that single channel ID. That is, according to operation sequence 200B, AES engines 40, 60 use the same 128-bit base key (and round keys derived therefrom) for every 128-bit input data blocks in a contiguous channel ID-base sequence, thereby performing five key-related cycles for the first iteration and four cycles for all other (non-first) iterations of the channel ID-homogenous series per round.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, fixed-function circuitry, programmable circuitry, whether alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted device (HMD) connected to a host computer system, a standalone HMD, a mobile device or computing system, or any other hardware platform capable of providing artificial reality content to one or more viewers.

What is claimed is:

1. A system on a chip (SoC) comprising:
   a security processor configured to determine that a first channel ID describing a {source, destination} tuple for a crypto packet matches a second channel ID describing a corresponding {source, destination} tuple for a preceding crypto packet received immediately prior to the crypto packet; and
   a decryption engine configured to, responsive to the determination that the first channel ID matches the second channel ID:
   obtain a set of round keys applied to perform an add round key computational stage of a previous decryption datapath used to decrypt a preceding cipher text block obtained from the preceding crypto packet; and reuse the set of round keys to perform a corresponding add round key computational stage of a current decryption datapath used to decrypt a cipher text block obtained from the crypto packet.

2. The SoC of claim 1, wherein the decryption engine is configured to bypass, responsive to the determination that the first channel ID matches the second channel ID, a key expansion computational stage with respect to the current decryption datapath used to decrypt the cipher text block obtained from the crypto packet.

3. The SoC of claim 1, wherein the security processor is further configured to:
decapsulate the crypto packet to obtain an encryption header and an encrypted payload that includes the cipher text block; and
parse the encryption header to obtain the channel ID describing the {source, destination} tuple for the crypto packet.

4. The SoC of claim 1, wherein to perform the corresponding add round key computational stage of the current decryption datapath, the decryption engine is configured to iteratively add each respective round key of the set of round keys to the cipher text block.

5. The SoC of claim 1,
wherein the security processor is configured to determine that a third channel ID describing a corresponding {source, destination} tuple for a subsequent crypto packet does not match the first channel ID, wherein the subsequent crypto packet is received at the SoC after the crypto packet is received at the SoC, and
wherein the decryption engine is configured to, responsive to the determination that the third channel ID does not match the second channel ID:
obtain a base key corresponding to the third channel ID;
perform key expansion with respect to the base key corresponding to the third channel ID to form a set of round keys from the base key;
use the set of round keys formed from the base key to perform a corresponding add round key computational stage of a subsequent decryption datapath used to decrypt a subsequent cipher text block obtained from the subsequent crypto packet.

6. The SoC of claim 1, wherein the SoC is configured to support an artificial reality application.

7. The SoC of claim 1, wherein the SoC is integrated into a head-mounted device (HMD).

8. The SoC of claim 1, wherein the SoC is integrated into a peripheral device that is communicatively coupled to a head-mounted device (HMD).

9. A system on a chip (SoC) comprising:
a security processor configured to determine that a first channel ID describing a {source, destination} tuple for a crypto packet matches a second channel ID describing a corresponding {source, destination} tuple for a preceding crypto packet transmitted immediately prior to the crypto packet; and
an encryption engine configured to, responsive to the determination that the first channel ID matches the second channel ID:
obtain a set of round keys applied to perform an add round key computational stage of a previous encryption datapath used to encrypt a preceding input block to form a preceding cipher text block encapsulated in the preceding crypto packet; and
reuse the set of round keys to perform a corresponding add round key computational stage of a current encryption datapath used to encrypt an input block to form a cipher text block to be encapsulated in the crypto packet.

10. The SoC of claim 9, wherein the encryption engine is configured to bypass, responsive to the determination that the first channel ID matches the second channel ID, a key expansion computational stage with respect to the current encryption datapath used to encrypt the cipher text block to be encapsulated in the crypto packet.

11. The SoC of claim 9, wherein the security processor is further configured to:
form an encryption header including the channel ID describing the {source, destination} tuple for the crypto packet; and
encapsulate the encrypted cipher text block as an encrypted payload with the encryption header to form the crypto packet.

12. The SoC of claim 9, wherein to perform the corresponding add round key computational stage of the current encryption datapath, the encryption engine is configured to iteratively add each respective round key of the set of round keys to the input block to form the cipher text block.

13. The SoC of claim 9,
wherein the security processor is configured to determine that a third channel ID describing a corresponding {source, destination} tuple for a subsequent crypto packet does not match the first channel ID, wherein the subsequent crypto packet is transmitted after the crypto packet is transmitted, and
wherein the encryption engine is configured to, responsive to the determination that the third channel ID does not match the second channel ID:
obtain a base key corresponding to the third channel ID;
perform key expansion with respect to the base key corresponding to the third channel ID to form a set of round keys from the base key;
use the set of round keys formed from the base key to perform a corresponding add round key computational stage of a subsequent encryption datapath used to encrypt a subsequent input block to form a subsequent cipher text block to be encapsulated in the subsequent crypto packet.

14. The SoC of claim 9, wherein the SoC is configured to support an artificial reality application.

15. The SoC of claim 9, wherein the SoC is integrated into a head-mounted device (HMD).

16. The SoC of claim 9, wherein the SoC is integrated into a peripheral device that is communicatively coupled to a head-mounted device (HMD).

17. An artificial reality system comprising:
a head-mounted device (HMD) that includes an HMD system on a chip (SoC) comprising:
an ingress interface configured to receive a crypto packet from a peripheral SoC of a peripheral device of the artificial reality system;
a security processor configured to determine that a first channel ID describing a {source, destination} tuple for the crypto packet matches a second channel ID describing a corresponding {source, destination} tuple for a preceding crypto packet received immediately prior to the crypto packet; and
a decryption engine configured to, responsive to the determination that the first channel ID matches the second channel ID:
obtain a set of round keys applied to perform an add round key computational stage of a previous decryption datapath used to decrypt a preceding cipher text block obtained from the preceding crypto packet; and reuse the set of round keys to perform a corresponding add round key computational stage of a current decryption datapath used to decrypt a cipher text block obtained from the crypto packet.

18. The artificial reality system of claim 17, wherein the decryption engine is configured to bypass, responsive to the determination that the first channel ID matches the second channel ID, a key expansion computational stage with respect to the current decryption datapath used to decrypt the cipher text block obtained from the crypto packet.

19. The artificial reality system of claim 17, wherein the security processor is further configured to:

decapsulate the crypto packet to obtain an encryption header and an encrypted payload that includes the cipher text block; and parse the encryption header to obtain the channel ID describing the {source, destination} tuple for the crypto packet.

20. The artificial reality system of claim 17, wherein to perform the corresponding add round key computational stage of the current decryption datapath, the decryption engine is configured to iteratively add each respective round key of the set of round keys to the cipher text block.

\* \* \* \* \*